(12) United States Patent
Hyodo et al.

(10) Patent No.: US 6,702,485 B2
(45) Date of Patent: Mar. 9, 2004

(54) PHOTOSENSITIVE MATERIAL PROCESSING APPARATUS AND PLEATED CARTRIDGE FILTER

(75) Inventors: Tomoyoshi Hyodo, Kanagawa (JP); Katsuhiko Tanaka, Kanagawa (JP); Fumio Mogi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/145,711

(22) Filed: May 16, 2002

(65) Prior Publication Data

US 2002/0191975 A1 Dec. 19, 2002

(30) Foreign Application Priority Data

May 24, 2001 (JP) .................................. 2001-155715
May 16, 2001 (JP) .................................. 2001-145814
May 17, 2001 (JP) .................................. 2001-147815
Sep. 14, 2001 (JP) .................................. 2001-279207

(51) Int. Cl.[7] .............................. G03D 3/02; G03D 13/00
(52) U.S. Cl. ........................ 396/565; 396/626; 396/636; 355/27; 134/64 P
(58) Field of Search ............................. 396/565, 626, 396/636; 355/27–29; 134/64 P, 122 P; 430/30, 399

(56) References Cited

U.S. PATENT DOCUMENTS

| | | | | |
|---|---|---|---|---|
| 3,641,911 A | * | 2/1972 | Aeiterman et al. | 134/64 R |
| 3,978,505 A | * | 8/1976 | Lever | 396/589 |
| 4,712,899 A | * | 12/1987 | Nishimoto | 396/626 |
| 4,888,608 A | * | 12/1989 | Kummerl | 396/572 |
| 5,633,697 A | * | 5/1997 | Kinoshita | 396/626 |
| 5,689,751 A | * | 11/1997 | Ueda | 396/626 |

FOREIGN PATENT DOCUMENTS

| | | | |
|---|---|---|---|
| DE | 3145551 | * | 5/1983 |
| JP | 4281452 | | 10/1992 |
| JP | 3145649 | | 8/1998 |
| JP | 2000 258881 | | 9/2000 |

* cited by examiner

Primary Examiner—D. Rutledge
(74) Attorney, Agent, or Firm—Birch, Stewart, Kolasch & Birch, LLP

(57) ABSTRACT

A photosensitive material processing apparatus according to the present invention includes a tank that has a body charged with a solution that processes the photosensitive material, the apparatus comprising a filter for purifying the processing solution, and a conduit for circulating the processing solution from a lower region of the tank body to an upper region of the tank body. Further, a pleated cartridge filter for use in a photosensitive material processing comprises a cylindrical pleated filter body formed by folding a filtering sheet member; and a blocking member, including a hole that communicates between an interior of the filter body and the outside, for blocking at least one end of the filter body, wherein a portion of the blocking member contacting the fitting portion is compressed when the blocking member is fitted to the fitting portion to closely contact the same.

23 Claims, 33 Drawing Sheets

32(10N1)(10N2)(10N3)(10N4)(10N5)(10N6)

| FLOW RATE X (liters/min.) | DISTANCE D(mm) | CAVITATION |
|---|---|---|
| 3 | 3 | ○ |
| 3 | 5 | ◎ |
| 3 | 7 | ◎ |
| 6 | 3 | ×~△ |
| 6 | 5 | ◎ |
| 6 | 7 | ◎ |
| 10 | 3 | × |
| 10 | 5 | ○ |
| 10 | 7 | ◎ |
| 20 | 3 | ×× |
| 20 | 5 | × |
| 20 | 7 | △~○ |

| | HEIGHT H | STATE | EVALUATION |
|---|---|---|---|
| 1 | 0-5 | BACTERIA OR THE LIKE ADHERES TO PHOTOSENSITIVE MATERIAL | × |
| 2 | 5-25 | DUST OR THE LIKE CAN BE EFFICIENTLY RECOVERED BY FILTER AND DOES NOT ADHERE TO PHOTOSENSITIVE MATERIAL | ◎ |
| 3 | 25-100 | DUST OR THE LIKE CAN BE RECOVERED BY FILTER BUT EFFICIENCY IS WORSE THAN IN THE ABOVE 2 AND RECOVERY AMOUNT IS POOR | ○~△ |
| 4 | 100- | BUOYANT DUST CANNOT BE CARRIED TO FILTER | × |

PHOTOSENSITIVE MATERIAL PROCESSING APPARATUS AND PLEATED CARTRIDGE FILTER

BACKGROUND OF THE INVENTION

1. Field of the Invention

The present invention relates to a photosensitive material processing apparatus and a pleated cartridge filter that maintains stable processing performance by purifying a processing solution charged in a processing tank in which the photosensitive material is immersed.

2. Description of the Related Art

Photosensitive material processing apparatus for forming images on a variety of photosensitive materials, such as silver photographic photosensitive material (color print), are generally being used.

In some of these apparatus, a color print is obtained by successively immersing exposed photosensitive material (color print) in developing solution within a color developer tank, in bleaching-fixing solution within a bleaching-fixing tank, and in water within a rinsing tank, to thereby successively color develop, bleach-fix, and rinse the photosensitive material while the photosensitive material is conveyed at a predetermined speed.

As shown in FIG. 33, in the prior art there are photosensitive material processing apparatus disposed with a processing solution tank 100 (such as a color developing tank, a bleaching-fixing tank or a rinsing tank) for storing a processing solution into which the photosensitive material is immersed.

The processing solution tank 100 includes a substantially rectangular tank body 102 for storing a predetermined processing solution therein and a rack 104 that is detachably mounted within the tank body 102 and immersed in the processing solution.

The processing rack 104 is configured so that the photosensitive material is subjected to desired processing while the photosensitive material is immersed in the processing solution in the tank body 102 and conveyed along a U-shaped conveyance path by conveyance rollers.

The tank body 102 includes a subtank 106 that is integrally mounted to an upper part of a vertical side wall 102A. A drainage port 108 leading to the interior of the subtank 106 is disposed in the vertical side wall 102A at a position vertically lower by a predetermined distance from the surface of the processing solution stored in the tank body 102. The drainage port 108 drains processing solution in the tank body 102 to the subtank 106.

The subtank 106 includes a bottom that communicates with an opening at one end of a circulatory conduit 110, and a filter 112 is disposed at the opening. An opening at the other end of the circulatory conduit 110 communicates with a central portion at the bottom of the tank body 102.

The circulatory conduit 110 is formed as a series of conduits allowing communication between the bottom of the subtank 106 and the central bottom portion of the tank body 102.

The circulatory conduit 110 is successively disposed, from the subtank 106 towards the tank body 102, with a heater 114 and a pump 116.

By driving the pump 116, processing solution in the upper region of the tank body 102 is drawn into the subtank 106 through the drainage port 108, and is sucked into the circulatory conduit 110 through the filter 112. The filter 112 purifies the processing solution of the tank 100 by removing dust particles from the processing solution.

Processing solution sucked into the circulatory conduit 110 is heated to a predetermined temperature by the heater 114 and pressurized by the pump 116, and then it is discharged from the opening in the central portion of the bottom of the tank body 102 to the lower region of the tank body 102. The discharged processing solution rises from the lower region of the tank body 102 to the upper region of the tank body 102, whereby the processing solution is circulated.

Namely, processing solution in the tank 100 is discharged from the circulatory conduit 110 to the lower region of the tank body 102, flows upwards from the lower region of the tank body 102 to the upper region of the tank body 102, flows though the drainage port 108 into the subtank 106, and is then sucked through the filter 112 into the circulatory conduit 110, whereby the filter 112 removes dust particles and purifies the processing solution.

In this type of system for circulating and purifying processing solution in the tank 100, processing solution that is discharged from the opening, which has a small sectional area, of the circulatory conduit 110 in the bottom surface of the tank body 102 rises at a remarkably low velocity from the lower region of the tank body 102 to the upper region of the tank body 102, which has a large sectional area.

Therefore, microparticles, such as dust particles that are not removed by the filter 112 and become mixed in the processing solution in the tank body 102, settle at the bottom of the tank body 102 and remain in a floatable condition on the bottom surface of the tank body 102.

If the processing rack 104 is mounted or removed while such particles are in a floatable condition on the bottom surface of the tank body 102, the particles that have accumulated on the bottom surface of the tank body 102 rise up in the processing solution and adhere to the surface of the photosensitive material, whereby the photosensitive material may sustain damage as it is conveyed by conveyance rollers or the like.

There are photosensitive material processing apparatus disposed with horizontal multiple-chamber processors (disclosed in Japanese Patent Application Laid-open Publication (JP-A) No. 2000-258881) that are partitioned by blades in order to expedite rapid processing of the photosensitive material. When the processing solution in the tank body 102 is circulated or when the processing rack 104 is mounted or removed, dust particles floating in the processing solution may adhere to the blades and damage the surface of the photosensitive material as the photosensitive material makes sliding contact with and passes over the blades. When the photosensitive material is processed with its emulsion surface facing down, dust particles floating in the processing solution may adhere to the emulsion surface, whereby the surface of the photosensitive material may be scrubbed by the dust particles and damaged as it makes sliding contact with and passes over the blades.

Additionally, when processing solution that has been purified by the filter 112 and heated and temperature-adjusted by the heater 114 rises up from the circulatory conduit 110 opening in the bottom surface of the tank body 102 at an extremely low flow velocity towards the upper region of the tank body 102, it becomes easy for irregularities in the flow of the processing solution to arise because the processing solution rises up along a substantially fixed course from the lower region of the tank body 102 to the upper region of the tank body 102.

Thus, the heated and temperature-adjusted processing solution is mixed with some of the processing solution in the tank body 102, whereby the temperature of and distribution of components in the entire processing solution in the tank body 102 becomes uneven.

When the photosensitive material is immersed in and processed by processing solution within the tank body 102 whose temperature and component distribution have become uneven, developer streaks can appear in the photosensitive material.

Recently, in response to the increasing demand for rapid processing of photosensitive material, there have been proposed photosensitive material processing apparatus of a submerged conveyance system using a blade (e.g., JP-A No. 4-281452).

However, it has been found that, in such photosensitive material processing apparatus using a blade, dust particles up to 30 microns in size do not cause damage even if they are present in the processing solution while the photosensitive material is being processed.

Therefore, there has been proposed a plastic filter that is sintered and molded with resin particles finer than those of the prior art, as disclosed in Japanese Patent No. 3145649.

However, because the amount of dust particles to be filtered out increases in plastic filters that have been sintered and molded of fine resin particles without increasing the filtration area, the lifetime becomes shorter than that of the prior art.

It is conventionally known that a pleated filter can be used to increase the filtration area. However, there has not been proposed a simple and inexpensive pleated filter that can be reliably sealed without using an O-ring or packing ordinarily used for a fitting portion.

SUMMARY OF THE INVENTION

It is an object of the present invention to provide a photosensitive material processing apparatus that can maintain stable processing performance for forming damage-free images on photosensitive material by preventing dust particles and the like floating in processing solution stored within a processing tank from settling at the bottom of the tank and remaining in a floatable condition, and by suppressing damage to photosensitive material caused by dust floating up in the processing solution.

Another object of the invention is to provide a photosensitive material processing apparatus that can maintain stable processing performance for forming images free from developer streaks by circulating processing solution, which is purified, heated and temperature-adjusted, so that the processing solution is distributed all throughout a processing solution tank and uniformly mixed to make uniform the overall temperature of and distribution of components in the processing solution.

Still another object of the invention is to provide a photosensitive material processing apparatus and a pleated cartridge filter that has a longer lifetime than those of conventional sintered resin filters and that can be reliably sealed without using known O-rings or packing in a fitting portion.

According to a first aspect of the present invention, there is provided a photosensitive material processing apparatus including a tank that has a body charged with a solution that processes the photosensitive material, the apparatus comprising: a filter for purifying the processing solution; and a conduit for circulating the processing solution from a lower region of the tank body to an upper region of the tank body.

According to a second aspect of the invention, there is provided a photosensitive material processing apparatus including a tank that has a body charged with a solution that processes the photosensitive material, the apparatus comprising: a filter disposed on an inner bottom surface of the tank body; and a conduit for circulating the processing solution passing through the filter from a lower region of the tank body to an upper region of the tank body.

According to a third aspect of the invention, there is provided a photosensitive material processing apparatus including a tank that has a body charged with a solution that processes the photosensitive material, the apparatus comprising: an auxiliary chamber formed integrally with a bottom surface of the tank body; a filter that covers an opening in the auxiliary chamber; and a conduit for drawing processing solution that has passed through and been purified by the filter from a lower region of the tank body and sending the processing solution to an upper region of the tank body, to thereby circulate the processing solution charged in the tank body from the upper region to the lower region.

According to a fourth aspect of the invention, there is provided a photosensitive material processing apparatus including a tank that has a body charged with a solution that processes the photosensitive material, the apparatus comprising: a plate-shaped filter that covers an entire bottom surface of the tank body and is spaced apart from the bottom surface; and a conduit for drawing the processing solution from an opening in the bottom surface of the tank body up through the filter to purify the processing solution and for sending the processing solution to an upper region of the tank body, to thereby circulate the processing solution charged in the tank body from the upper region to a lower region.

According to a fifth aspect of the invention, there is provided a photosensitive material processing apparatus including a pump and a tank that has a body charged with a solution that processes the photosensitive material, the apparatus comprising: an auxiliary chamber formed integrally with a bottom surface of the tank body; a filter that covers an opening in the auxiliary chamber and is disposed such that an outer peripheral surface of the filter is positioned at a distance D in mm from an inner peripheral surface of the auxiliary chamber, with D being greater than $0.23X+2.5$, X representing actual flow rate in liters/minute of the pump; and a conduit for drawing the processing solution that has passed through and been purified by the filter from a lower region of the tank body and sending the processing solution to an upper region of the tank body, to thereby circulate the processing solution charged in the tank body from the upper region to the lower region.

According to a sixth aspect of the invention, there is provided a photosensitive material processing apparatus including a tank that has a body charged with a solution that processes the photosensitive material, the apparatus comprising: a filter for purifying the processing solution; a subtank disposed on an outer side of a vertical side wall of the tank body and having a depth of at least one half that of the tank body; a plurality of through holes disposed on the vertical side wall between the tank body and the subtank; and a path for drawing processing solution from a lower region of the tank body through the filter and sending the processing solution to the subtank, and then passing the processing solution from the subtank through the through holes so that the processing solution flows evenly into the tank body from the subtank, to thereby uniformly mix the processing solution in the tank body.

According to a seventh aspect of the invention, there is provided a photosensitive material processing apparatus including a tank that has a body charged with a solution that processes the photosensitive material, the apparatus comprising: a filter for purifying the processing solution; a subtank disposed on an outer side of a vertical side wall of the tank body and having a depth of at least one half that of the tank body; a plurality of through holes disposed on the vertical side wall between the tank body and the subtank; a plurality of through holes disposed in a vertical side wall of a processing rack in the tank body at positions facing and corresponding to the through holes formed in the vertical side wall of the tank body; and a path for drawing processing solution from a lower region of the tank body through the filter and sending the processing solution to the subtank, and then passing the processing solution from the subtank through the through holes so that the processing solution flows evenly into the tank body from the subtank, to thereby uniformly mix the processing solution in the tank body.

According to an eighth aspect of the invention, there is provided a photosensitive material processing apparatus including a tank that has a body charged with a solution that processes the photosensitive material, the apparatus comprising: a filter for purifying the processing solution; a subtank disposed on an outer side of a vertical side wall of the tank body and having a depth of at least one half that of the tank body; a plurality of through holes disposed across a vertical range in the vertical side wall between the tank body and the subtank; and a path including branch pipes corresponding to the through holes, the path drawing the processing solution from a lower region of the tank body through the filter and sending the processing solution through the branch pipes corresponding to the through holes so that the processing solution flows evenly into the tank body, to thereby uniformly mix the processing solution in the tank body.

According to a ninth aspect of the invention, there is provided a photosensitive material processing apparatus including a tank that has a body charged with a solution that processes the photosensitive material, the apparatus comprising: a filter for purifying the processing solution; a subtank disposed on an outer side of a vertical side wall of the tank body and having a depth of at least one half that of the tank body; a through hole formed in a slit shape from an upper part of the vertical side wall to a lower part of the vertical side wall between the tank body and the subtank, with the sectional area of the through hole gradually becoming smaller from the upper part of the vertical side wall to the lower part of the vertical side wall; and a path for drawing processing solution from a lower region of the tank body through the filter and sending the processing solution to the subtank, and then passing the processing solution from the subtank through the slit-shaped through hole so that the processing solution flows evenly from a top part of the subtank to a bottom part of the subtank and into the tank body, to thereby uniformly mix the processing solution in the tank body.

According to a tenth aspect of the invention, there is provided a pleated cartridge filter for use in a photosensitive material processing apparatus including a processing tank charged with a solution that processes photosensitive material, a device for circulating the processing solution, and a fitting portion that is disposed in the circulation device and to which a filter for removing dust particles from the processing solution is fitted, the cartridge filter comprising: a cylindrical pleated filter body formed by folding a filtering sheet member; and a blocking member, including a hole that communicates between an interior of the filter body and the outside, for blocking at least one end of the filter body, wherein a portion of the blocking member contacting the fitting portion is compressed when the blocking member is fitted to the fitting portion to closely contact the same.

According to an eleventh aspect of the invention, there is provided a photosensitive material processing apparatus comprising: a processing tank charged with a processing solution that processes photosensitive material; a device for circulating the processing solution; and a fitting portion to which the pleated cartridge filter provided in the tenth aspect is fitted, wherein the fitting portion is recessed, with an aperture in a vicinity of an opening in the recess being 0.5 to 3.0% larger than an external diameter of the portion of the pleated cartridge filter that contacts the recess.

BRIEF DESCRIPTION OF THE DRAWINGS

FIG. 16 is a table showing results of experiments in which the propriety of a processing state of the photosensitive material was examined by changing a distance between the photosensitive material immersed in the processing solution in the tank body and the filter of the photosensitive material processing apparatus according to the fifth embodiment of the invention;

DESCRIPTION OF THE PREFERRED EMBODIMENTS

First Embodiment

A first embodiment of a photosensitive material processing apparatus of the present invention will be described with reference to FIGS. 1 and 2.

Figure 1:
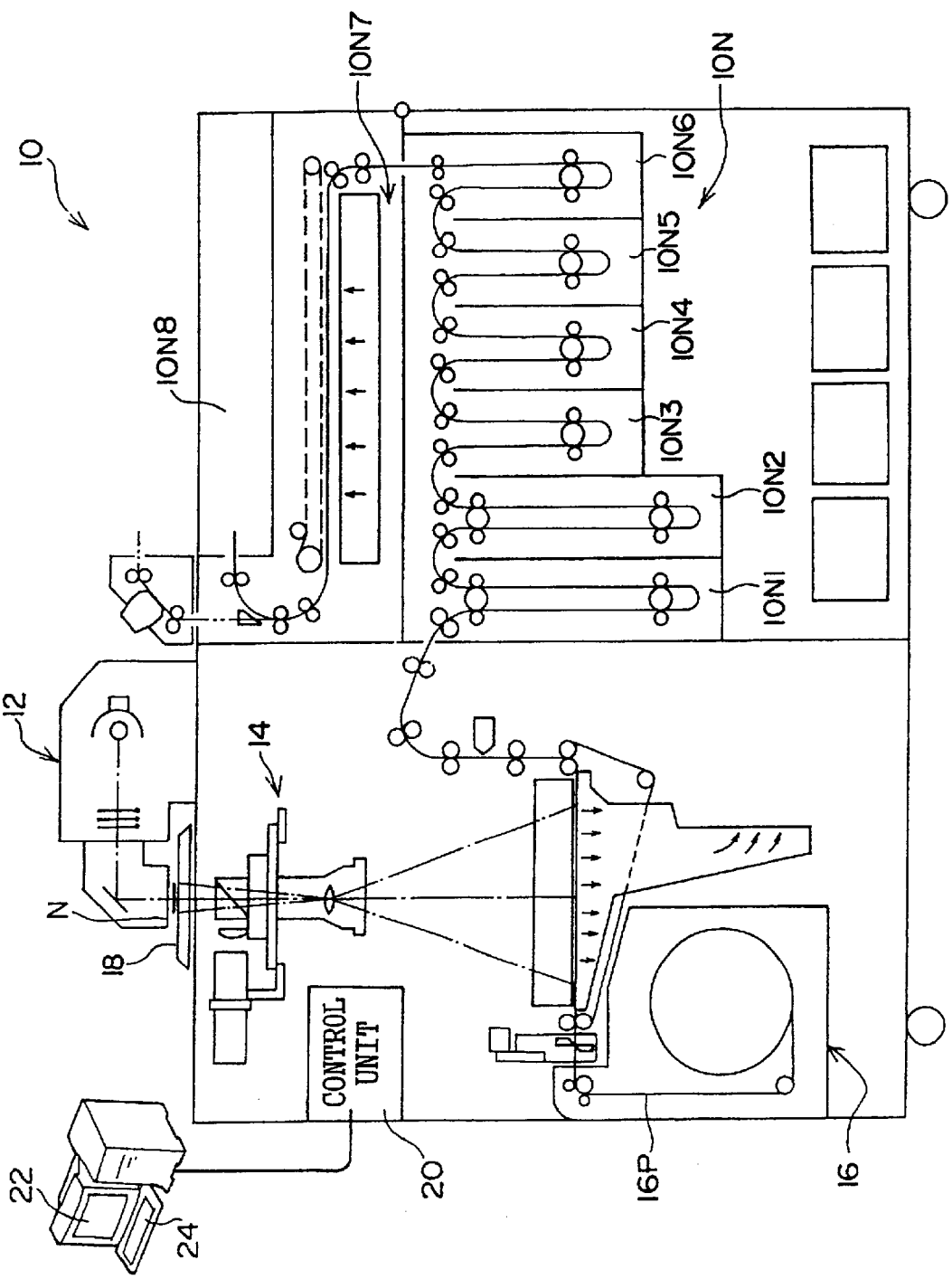
FIG. 1 is a schematic view showing an overall photosensitive material processing apparatus according to the invention.

As shown in FIG. 1, a printer processor 10 for processing photosensitive material includes a light source unit 12, which has an optical control filter composed of C, M and Y filters, a reflecting mirror and a halogen lamp, and a magazine 16 for accommodating color paper 16P that serves as photosensitive material for photography.

The light source unit 12 emits light that irradiates an exposure unit 14 via negative film N loaded in a negative carrier 18. The color paper 16P is pulled out from the magazine 16, printed with the image of the negative film N at the exposure unit 14, and conveyed to a processing section 10N.

The processing section 10N includes a color developing tank 10N1, a bleaching-fixing tank 10N2, rinsing tanks 10N3 to 10N6, and a drying unit 10N7. The color developing tank 10N1 contains a color developing solution, the bleaching-fixing tank 10N2 contains a bleaching-fixing solution, and each of the rinsing tanks 10N3 to 10N6 contains a rinsing solution.

The color paper 16P conveyed to the processing section 10N successively passes through the color developing tank 10N1, the bleaching-fixing tank 10N2 and the rinsing tanks 10N3 to 10N6, whereby the color paper 16P is developed, fixed, and rinsed in the respective processing tanks. After being rinsed, the color paper 16P is conveyed to the drying unit 10N7, where it is dried and a color print is created. Thereafter, the color print is placed on a sorter 10N8.

The printer processor 10 includes a control unit 20 that implements operations to create color prints by automatically controlling various units in the processing apparatus body. The control unit 20 is connected to a monitor 22 and a keyboard 24 that are used by an operator for giving commands.

When the printer processor 10 is turned on, the control unit 20 adjust/controls the temperatures of the respective processing solutions. After the temperatures of the respective processing solutions have been adjusted to set temperatures, the color paper 16P is pulled out from the magazine 16 and conveyed to the exposure unit 14 by the control of the control unit 20, whereby the color paper 16P is exposed.

After being exposed, the color paper 16P is conveyed by conveyance rollers through the respective processing tanks 10N1 to 10N6, whereby the color paper 16P is immersed in and developed by the respective processing solutions. The developed color paper 16P is then dried by the drying unit 10N7 and stocked in the sorter 10N8.

Figure 2:
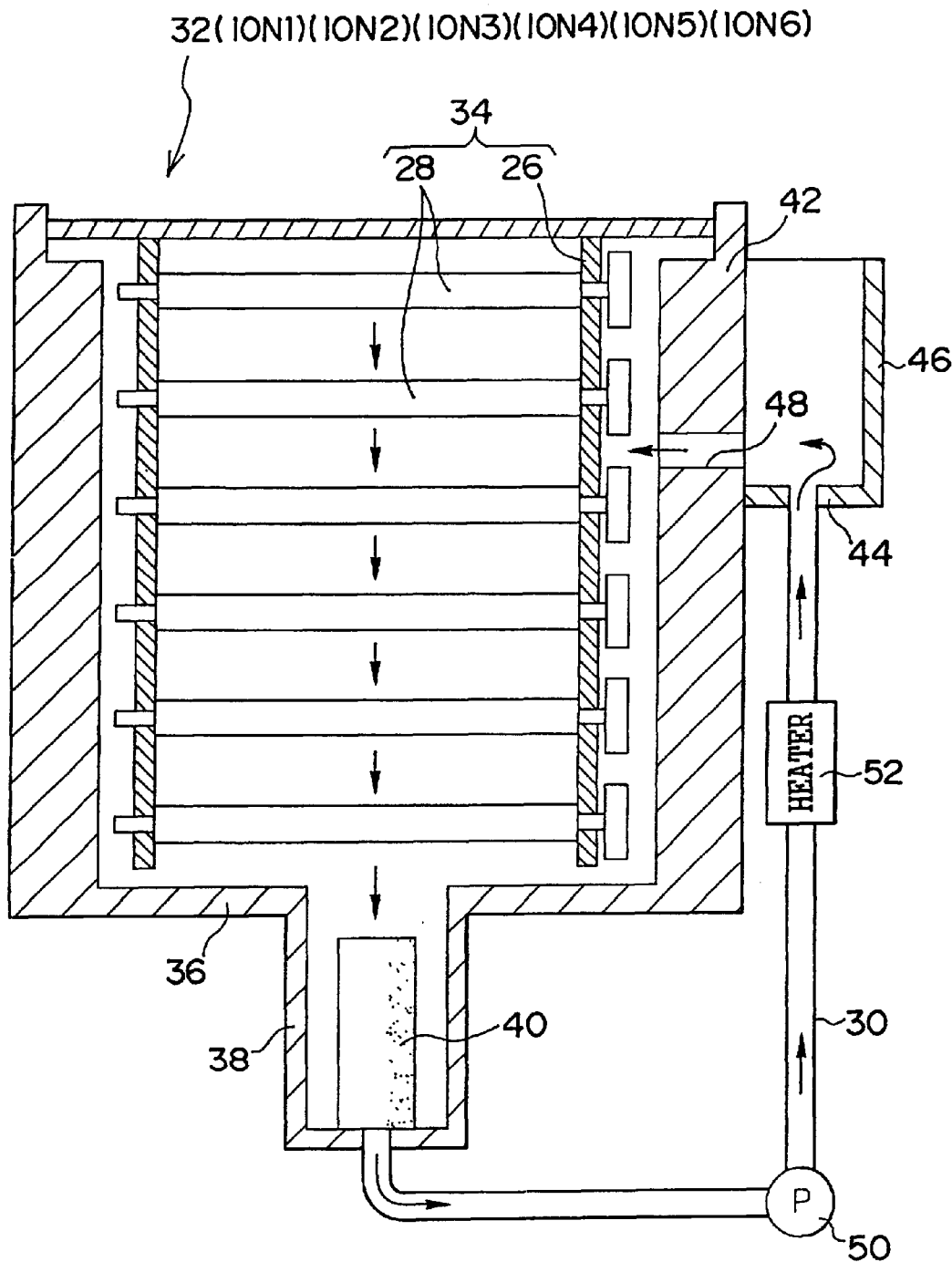
FIG. 2 is a schematic view showing a tank body in a photosensitive material processing apparatus according to a first embodiment of the invention.

Each of the color developing tank 10N1, the bleaching-fixing tank 10N2, and the rinsing tanks 10N3 to 10N6 is configured as shown in FIG. 2, and includes a substantially rectangular tank body 32 for containing a predetermined processing solution, a circulation system for circulating and purifying the predetermined processing solution, and a processing rack 34 detachably mounted in the tank body 32. The processing rack 34 is mounted at a position at which it is dipped in the predetermined processing solution.

The processing rack 34 includes a frame 26 on which a plurality of conveyance rollers 28 is disposed along a predetermined U-shaped conveyance path. The conveyance rollers 28 are drivingly rotated to convey the photosensitive material along the U-shaped conveyance path that continues through the processing solution in the tank body 32, whereby the photosensitive material is subjected to desired processing by the processing solution as it is immersed in the same.

The tank body 32 includes a bottom surface 36 having a center in the vicinity of which is integrally formed a recessed auxiliary chamber 38. The auxiliary chamber 38 is substantially cylindrical and includes a bottom having an opening that is integrally connected to, and communicates with, an opening at one end of a circulatory conduit 30.

An ordinary bottomed cylindrical filter 40 is disposed over the opening of the circulatory conduit 30, with a bottom of the filter 40 facing upward (i.e., the filter is inverted so that its bottom does not oppose the opening of the circulatory conduit 30). The processing solution in the auxiliary chamber 38 is thus sucked through the opening of the circulatory conduit 30 after the processing solution has passed through the filter 40.

It has been experimentally confirmed that the maximum diameter of dust particles that do not cause damage to photosensitive material is 30 microns, even if such dust particles contaminate the processing solution and adhere to the photosensitive material when the photosensitive material is processed in the printer processor 10. Therefore, the filter 40 employed in the first embodiment has a mesh of 30 microns and a filtration area of 100 $cm^2$.

A subtank 46 is formed integrally with an upper outer side of a vertical side wall 42 of the tank body 32. A through hole 48 that communicates between the interior of the subtank 46 and the interior of the tank body 32 is disposed in the vertical side wall 42 at a position vertically lower by a predetermined distance from the surface of the processing solution in the tank body 32. Processing solution that fills the subtank 46 flows into the tank body 32 through the through hole 48.

The other end of the circulatory conduit 30 includes an opening that is integrally connected to, and communicates with, a bottom 44 of the subtank 46.

The circulatory conduit 30 is formed as a series of conduits, with one end being connected to the bottom of the auxiliary chamber 38 and the other end being connected to the center of the bottom of the subtank 46.

The circulatory conduit 30 is successively disposed, from the opening in the bottom of the auxiliary chamber 38 towards the subtank 46, with a pump 50 and a heater 52.

By driving the pump 50 in each processing solution tank 10N1 (10N2, 10N3, 10N4, 10N5 or 10N6), processing solution in the lower region of the tank body 32 is drawn into the auxiliary chamber 38 and sucked into the circulatory conduit 30 through the filter 40. The filter 40 purifies the processing solution by adsorbing dust particles therefrom.

The pump 50 sucks the processing solution into the circulatory conduit 30 at a circulation rate of 1 to 7 liters/min. The processing solution is heated to a predetermined temperature by the heater 52 and is then discharged through the opening in the bottom 44 of the subtank 46 into the subtank 46. The heated processing solution then flows through the through hole 48 into the upper region of the tank body 32. The processing solution is continuously circulated so that the processing solution flowing into the tank body 32 flows down towards the lower region of the tank body 32.

The subtank 46 in each tank (10N1, 10N2, 10N3, 10N4, 10N5 and 10N6) is supplied with processing solution that has been pressurized by the pump 50 and temperature-adjusted by the heater 52. Thereafter, the processing solution flows from the subtank 46, through the through hole 48, and into the upper region of the tank body 32.

The processing solution thus flows into the upper region of the tank body 32 and then down towards the lower region of the tank body 32. At the same time, processing solution in the lower region flows into the auxiliary chamber 38 and is sucked through the filter 40, whereby dust particles are removed from the processing solution and the processing solution flows into the circulatory conduit 30.

The processing solution in each tank (10N1, 10N2, 10N3, 10N4, 10N5 and 10N6) is circulated downwards, from the upper region of the tank body 32 to the lower region of the tank body 32. Dust particles are removed from the processing solution by the filter 40 disposed at the bottom of the tank body 32. Therefore, dust particles greater than 30 microns, which might otherwise damage the color paper 16P, are carried towards the bottom of the tank body 32 by the flow of the processing solution from the upper region to the lower region, and settle on the bottom by their own weight.

Dust particles that have settled on the bottom of each tank (10N1, 10N2, 10N3, 10N4, 10N5 and 10N6) flow together into the auxiliary chamber 38 with the processing solution and are trapped by the filter 40. As a result, the processing solution is cleared of dust particles exceeding 30 microns that might otherwise damage the color paper 16P.

Hence, dust particles exceeding 30 microns, which might otherwise damage the photosensitive material, are trapped by the filter 40 so that they do not easily float. Damage to the surface of the color paper 16P is reduced by preventing dust particles exceeding 30 microns from floating up in the processing solution when the processing solution is circulated in the tank body 32 or when the processing rack 34 is mounted or removed. Thus, stable processing performance is maintained to form an image without damage to the color paper 16P.

Second Embodiment

Figure 3:
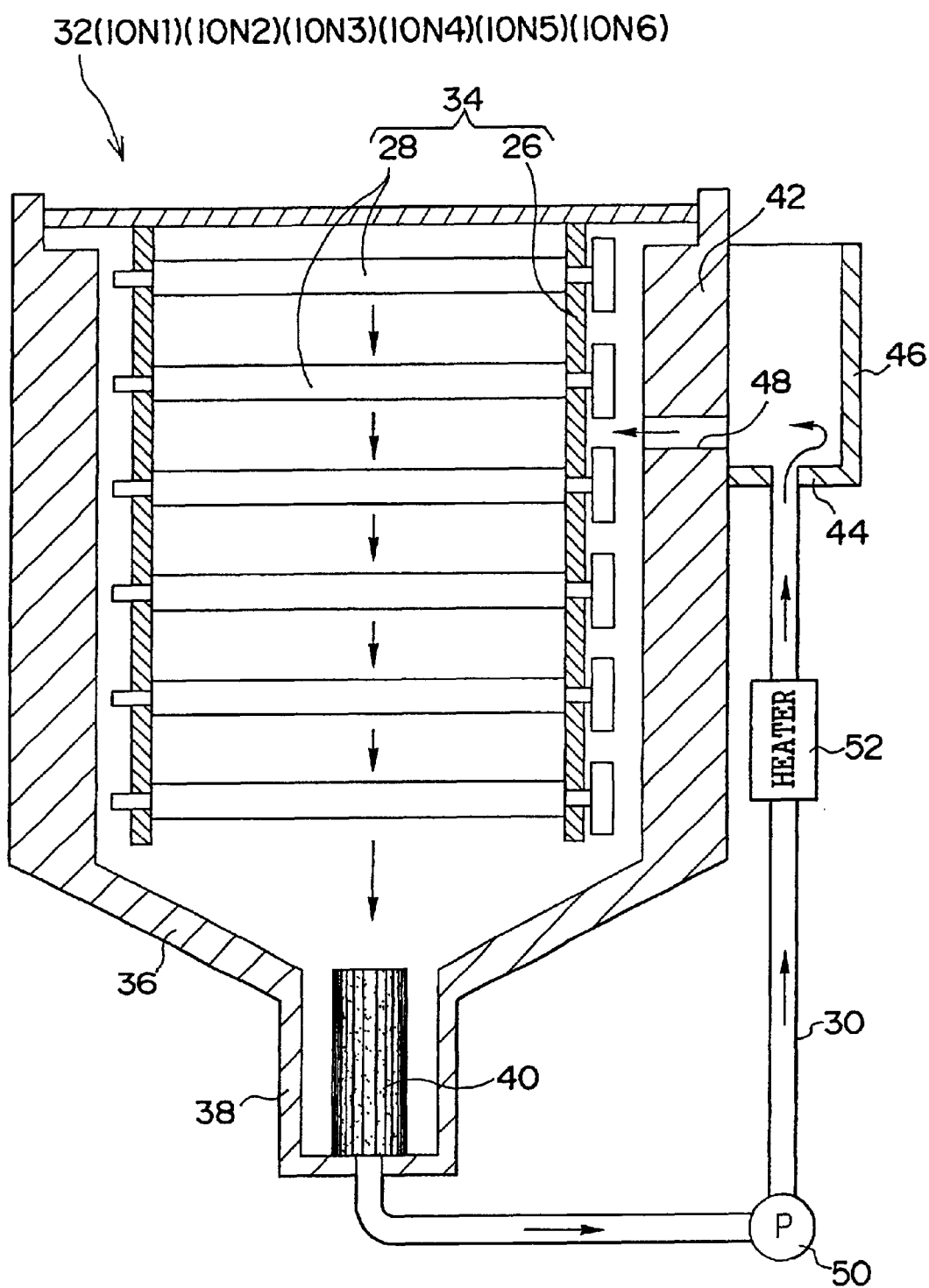
FIG. 3 is a schematic view showing a tank body in a photosensitive material processing apparatus according to a second embodiment of the invention.

A second embodiment of the invention will now be described with reference to FIG. 3. Components that are substantially the same as components previously described in the first embodiment are designated by the same reference numerals, and description thereof is omitted.

In the second embodiment, the bottom of the tank body 32 is modified so that it becomes easier for the dust particles to be accumulated. Moreover, the recommended frequency for replacing or cleaning the filter 40 is reduced.

Specifically, in the second embodiment, the bottom surface 36 of the tank body 32 is conically recessed toward the periphery of the auxiliary chamber 38 in order for the dust particles to be accumulated therein.

Because the bottom surface 36 is conically recessed, dust particles exceeding 30 microns that are carried by the processing solution and settle by their own weight along the conical slopes of the bottom surface 36 are easily accumulated in the auxiliary chamber 38. Therefore, the dust particles are not only efficiently accumulated in the auxiliary chamber 38 but are prevented from residing on the bottom surface 36, which makes it easier for the filter 40 to trap the dust particles.

Additionally, in the second embodiment, the recommended frequency for replacing or cleaning the filter 40 is reduced by pleating the filter 40 and enlarging the filtration area.

In this case, the filter 40 preferably has a filtration area of 600 $cm^2$ or more.

Because the filter 40 has a large filtration area, the frequency with which the filter 40 must be replaced or cleaned is reduced, even if replacing or cleaning the filter 40 is burdensome due to the filter 40 being disposed at the bottom of the tank body 32. Thus, the burden of maintaining the printer processor 10 is reduced and working efficiency over a long period of time is improved.

Third Embodiment

Figure 4:
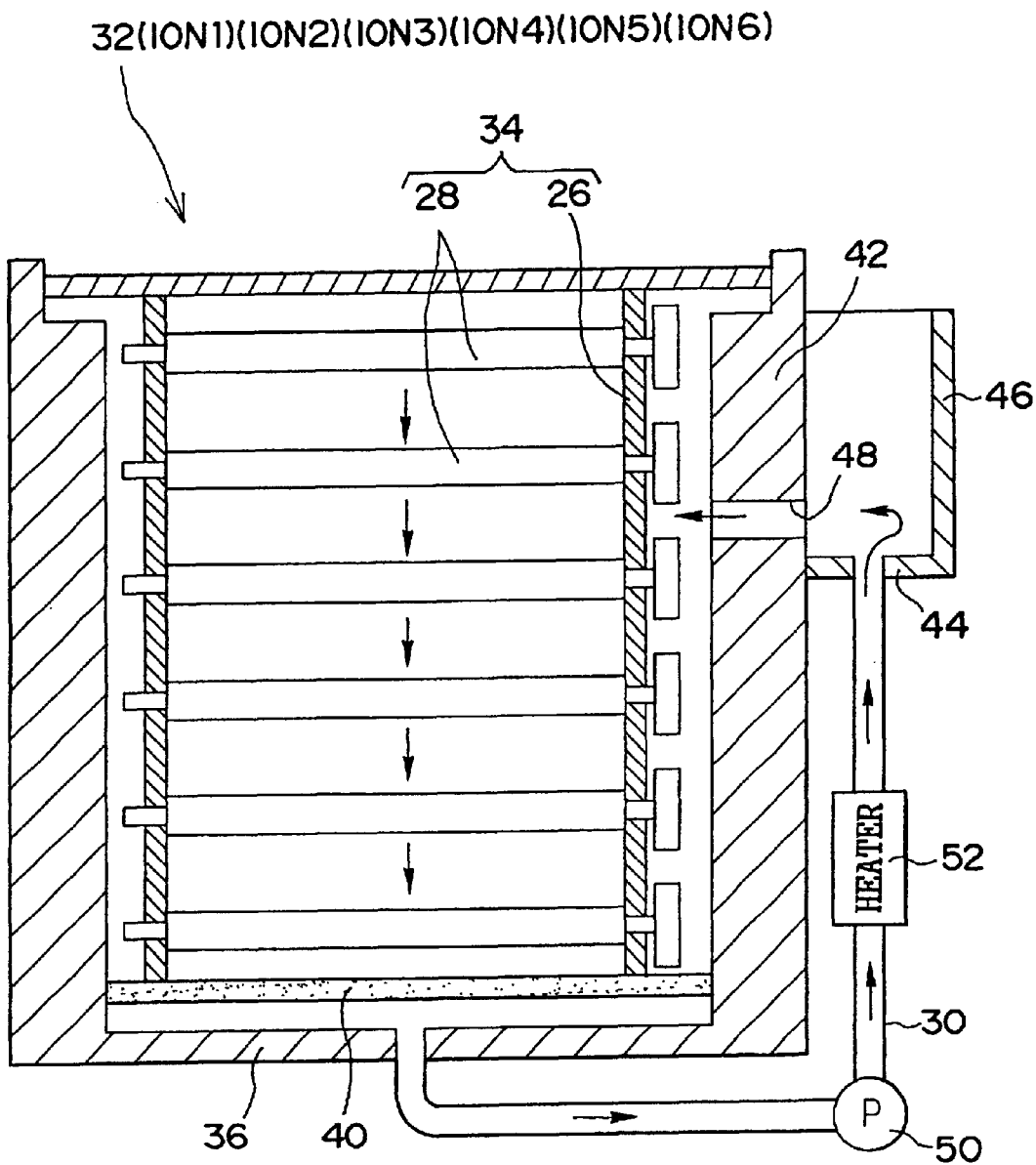
FIG. 4 is a schematic view showing a tank body in a photosensitive material processing apparatus according to a third embodiment of the invention.

A third embodiment of the invention will be described with reference to FIG. 4. Components that are substantially the same as components described in previous embodiments are designated by the same reference numerals, and description thereof is omitted.

In the third embodiment, the auxiliary chamber 38 is eliminated by disposing a plate-shaped filter 40 on the bottom surface of the tank body 32. Moreover, the recommended frequency for replacing or cleaning the filter 40 is reduced.

The opening at one end of the circulatory conduit 30 is integrally and directly connected to, and communicates with, the center of the bottom surface 36.

The plate-shaped filter 40 is disposed in the vicinity of the lower end of the processing rack 34 in the tank body 32 and across the entire bottom surface 36. Moreover, the filter 40 is spaced apart from the bottom surface 36 to establish a space that functions in the same manner as an auxiliary chamber.

Thus, not only is the structure of the tank body 32 simplified but the height of the tank body 32 is reduced.

When the processing solution is sucked through the opening in the center of the bottom surface 36 into the circulatory conduit 30, negative pressure is produced in the space between the bottom surface 36 and the filter 40. As a result, the processing solution in the lower region of the tank body 32 can be evenly sucked through the entire surface of the flat-shaped filter 40 disposed across the entire bottom surface 36.

Therefore, the processing solution in the tank body 32 is purified while passing evenly through the entire surface of the plate-shaped filter 40. Dust particles exceeding 30 microns are trapped across the entire surface of the plate-shaped filter 40. In other words, dust particles exceeding 30 microns are removed across the entire bottom surface 36.

Because the plate-shaped filter 40 traps dust particles exceeding 30 microns, which might otherwise damage the color paper 16P, across its entire surface, there is no potential for dust particles that have accumulated on the bottom surface of the tank body 32 to float up in the processing solution when the processing rack 34 is mounted or removed, which was a problem in the prior art.

Fourth Embodiment

A fourth embodiment of the invention will be described with reference to FIGS. 5 and 6. Components that are substantially the same as components described in previous embodiments are designated by the same reference numerals, and description thereof is omitted.

In the fourth embodiment, the auxiliary chamber 38 is disposed in the bottom surface of the tank body 32 in a photosensitive material processing apparatus including horizontal multiple-chamber processors partitioned by blades, and the filter 40 is disposed in the auxiliary chamber 38.

Figure 5:
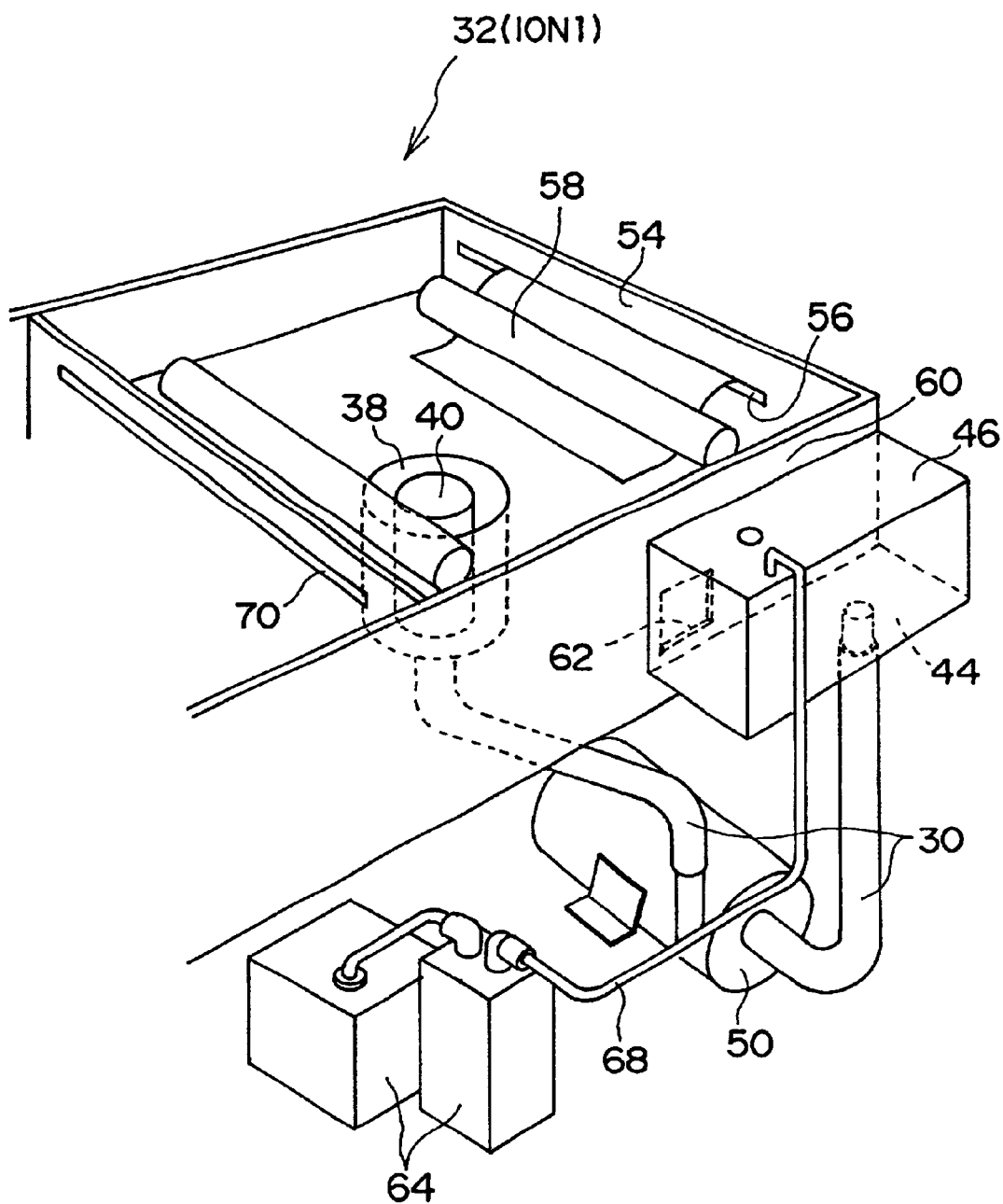
FIG. 5 is a schematic perspective view showing a tank body in a photosensitive material processing apparatus according to a fourth embodiment of the invention.

The tank body 32 shown in FIG. 5 is a color developing tank. A slit 56, through which the color paper 16P is inserted, is formed in a wall 54 that is located upstream (exposure unit side) in the direction in which the photosensitive material is conveyed.

The auxiliary chamber 38 is disposed at the bottom of the tank body 32 in order to suck the processing solution (color developing solution). An opening in the bottom of the auxiliary chamber 38 communicates with the circulatory conduit 30, and the filter 40 is disposed over the opening. Disposed upstream and downstream from the auxiliary chamber 38 in the conveyance direction are conveyance rollers 58 that clamp and convey the color paper 16P.

Moreover, the subtank 46 is disposed at one side of the tank body 32.

An opening 62 is formed in a partition 60 disposed between the tank body 32 and the subtank 46. The opening 62 allows the color developing solution to flow back and forth between the tank body 32 and the subtank 46.

The circulatory conduit 30 is connected at one end to the center of the bottom surface of the auxiliary chamber 38, further connected to both the suction and discharge sides of the pump 50, and finally connected to the bottom 44 of the subtank 46.

By driving the pump 50, the color developing solution in the lower region of the tank body 32 is sucked from the auxiliary chamber 38, purified through the filter 40, and pressurized and pumped to the subtank 46 by the pump 50. The processing solution flows from the subtank 46 through the opening 62 to the upper region of the tank body 32.

By thus circulating the color developing solution from the upper region of the tank body 32 to the lower region of the tank body 32, dust particles exceeding 30 microns are removed from the color developing solution and trapped by the filter 40.

Moreover, the subtank 46 can be supplied with the color developing solution via a conduit 68 from a processing solution tank 64.

A slit 70, through which the color paper 16P is passed, is formed in a partition that is located downstream in the conveyance direction A thin blade (not illustrated) made of an elastic body such as rubber or the like (e.g., rubber such as silicone rubber, fluorine rubber, polyurethane rubber or ethylene-propylene rubber, and elastomers or soft resins having excellent durability and chemical resistance) is mounted at the slit 70.

When the photosensitive material is conveyed through the slit 70, the blade elastically nips and slidably contacts both sides of the photosensitive material to prevent processing solution in the tank body 32 from flowing into the next tank body 32. Moreover, dust particles exceeding 30 microns are trapped in the filter 40 by circulating the processing solution from the upper region of the tank body 32 to the lower region of the tank body 32. Therefore, damage to the surface of the color paper 16P caused by dust particles adhering to the surface of the color paper 16P and the blade scraping the dust particles along the color paper 16P can be reduced.

Figure 6:
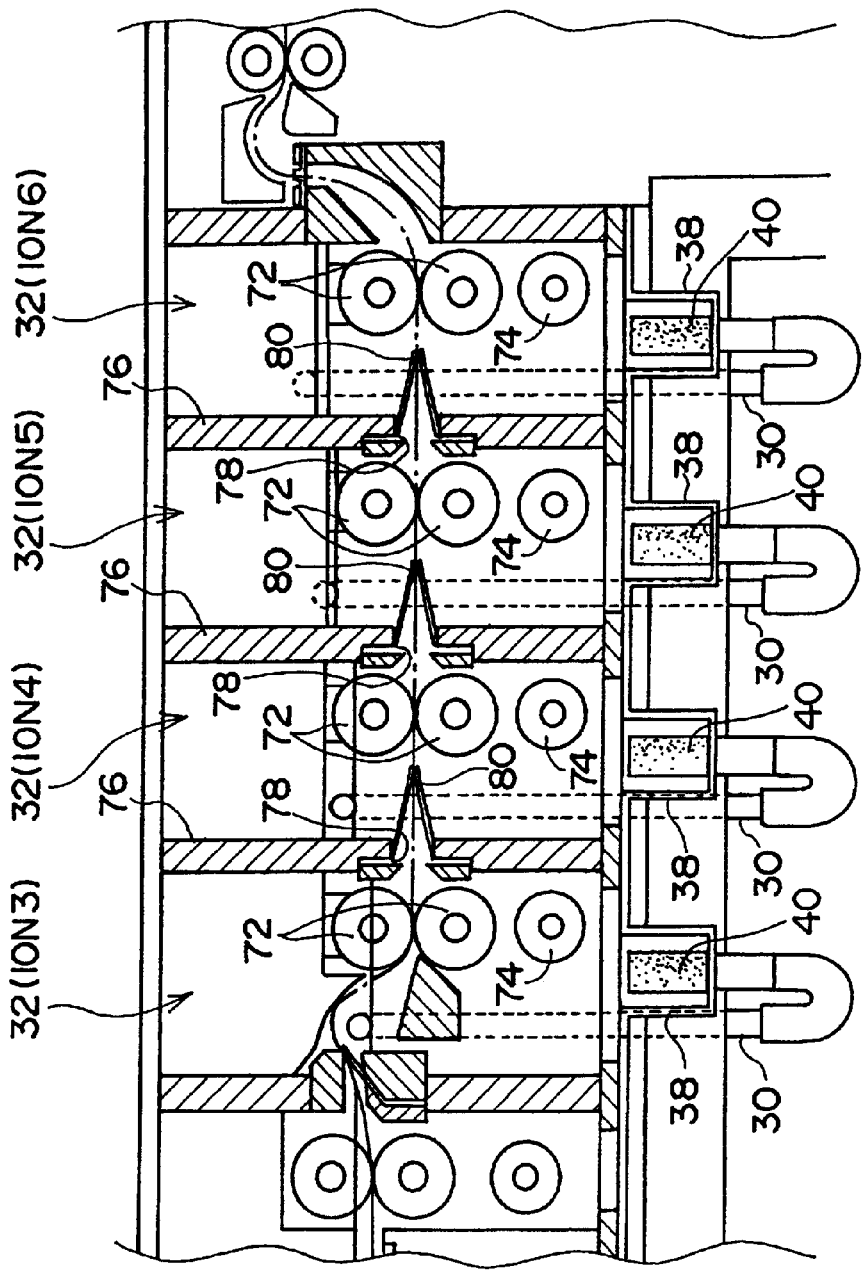
FIG. 6 is a schematic view showing the tank body in the photosensitive material processing apparatus according to the fourth embodiment of the invention.

A case will now be described in which the respective tank bodies 32 shown in FIG. 6 are the rinsing tanks 10N3 to 10N6.

As shown in FIG. 6, each of the rinsing tanks 10N3 to 10N6 includes conveyance rollers 72 for clamping and horizontally conveying the color paper 16P, and stirring rollers 74.

Each partition 76 between mutually adjacent rinsing tanks 10N3 to 10N6 is disposed with a slit 78 through which the color paper 16P is passed.

A thin blade 80 made of an elastic body such as rubber or the like (e.g., rubber such as silicone rubber, fluorine rubber, polyurethane rubber or ethylene-propylene rubber, and elastomers or soft resins having excellent durability and chemical resistance) is mounted at each slit 78. The blades 80 include long rectangular flanges for attachment to the partitions 76.

Each blade 80 includes a body that integrally projects downstream in the conveyance direction from the center of the flanges. The blade body includes an upper lip, which is disposed at a vertical upper end of the slit 78, and a lower lip, which is disposed at a vertical lower end of the slit 78. The upper and lower lips become closer to each other as they protrude downstream in the conveyance direction, and eventually come into close contact with each other at downstream ends. The downstream ends of the upper and lower lips are separable by elastic deformation of the upper and lower lips.

The blade 80 elastically clamps and slidably contacts both sides of the color paper 16P as the color paper 16P is conveyed through the slit 70, to thereby prevent processing solution in the tank body 32 from flowing into the next tank body 32.

The auxiliary chamber 38 for drawing the processing solution is disposed at the bottom of each of the rinsing tanks 10N3 to 10N6. An opening in the bottom surface of the auxiliary chamber 38 communicates with the circulatory conduit 30, and the filter 40 is disposed over the opening.

Each circulatory conduit 30 sucks processing solution in the lower region of the upstream side of the tank body 32 from the auxiliary chamber 38 through the filter 40, and discharges the sucked processing solution to the upper region of the tank body 32.

Although not illustrated, the most upstream tank body 32 (rinsing tank 10N3) is supplied as needed with fresh processing solution (or rinsing water). The processing solution is supplied to flow sequentially from the most upstream rinsing tank 10N3 to the most downstream rinsing tank 10N6. Excess processing solution is discharged from the most downstream tank body 32 (rinsing tank 10N6).

Thus, dust particles exceeding 30 microns can be trapped and removed by the filter 40 by circulating the processing solution from the upper region of each tank body 32 to the lower region of each tank body 32.

Hence, problems in the prior art can be overcome. Namely, damage to the surface of the color paper 16P caused by dust particles adhering to the blades 80, which dust particles float up when the processing solution is circulated or when the processing rack 34 is mounted or removed, is reduced. Additionally, damage caused by dust particles adhering to the emulsion surface of the color paper 16P, which dust particles float up in the processing solution when the color paper 16P is processed with its emulsion surface facing down, and the emulsion surface being slid across the blades 80, is reduced.

Fifth Embodiment

A fifth embodiment of the invention will now be described. Components that are substantially the same as components described in previous embodiments are designated by the same reference numerals, and description thereof is omitted.

In the auxiliary chamber 38, as shown in FIGS. 7 to 11, a bottomed cylindrical filter 140 having an end plate 141 on its bottom portion is so disposed over the opening of the circulatory conduit 30 connected to and communicated with the center of the bottom of the auxiliary chamber 38, with the end plate facing upward.

As described above, it has been experimentally confirmed that the maximum diameter of the dust particles that do not cause damage to the photosensitive material is 30 microns. Therefore, the filter 140 employed in the fifth embodiment has a mesh of 30 microns or less.

Figure 13:
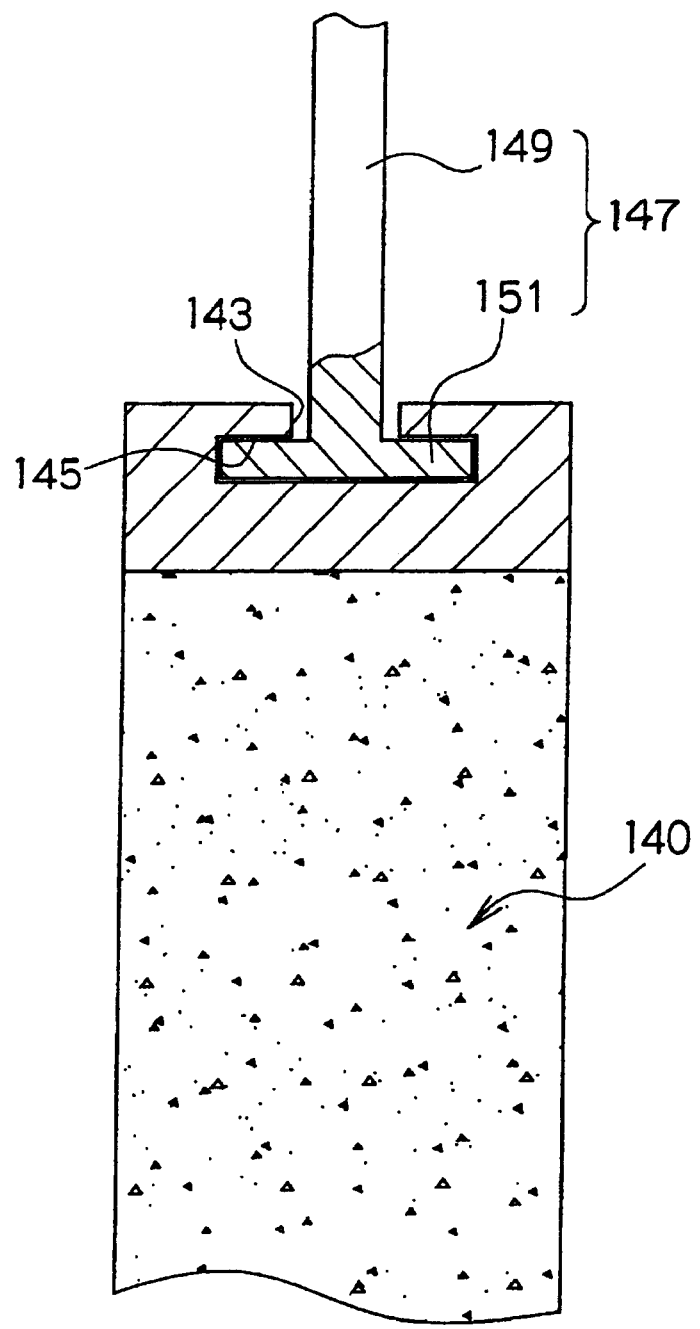
FIG. 13 is a longitudinal cross sectional view showing a state in which a jig is fitted in the filter disposed in the tank body of the photosensitive material processing apparatus according to the fifth embodiment of the invention.
Figure 14:
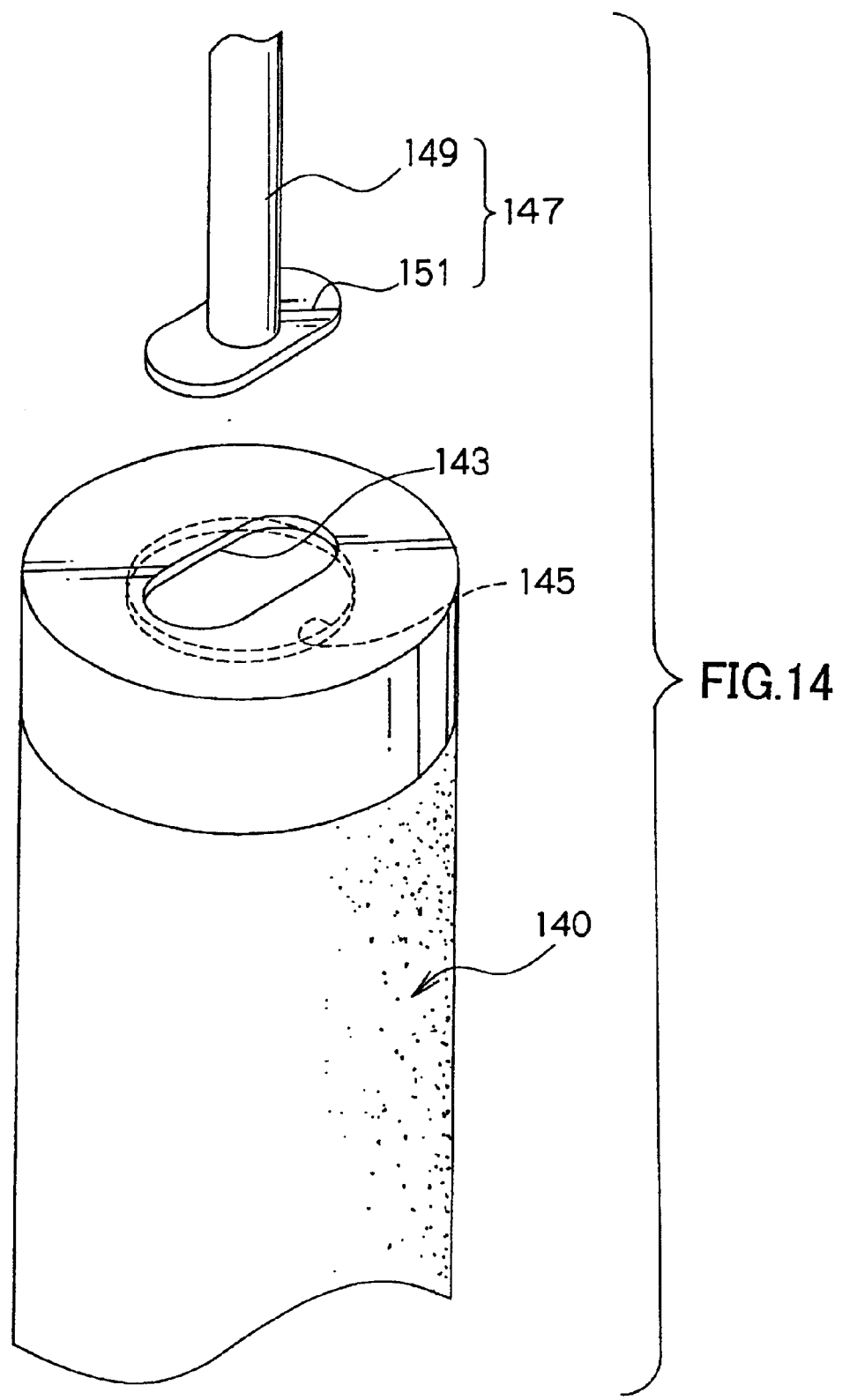
FIG. 14 is a perspective view showing the filter and the jig disposed in the tank body of the photosensitive material processing apparatus according to the fifth embodiment of the invention.

At the circular bottom surface of the end plate, as shown in FIGS. 13 and 14, a retention mechanism is formed for retaining the filter 140 on a jig 147 detachably. The retention mechanism of the end plate 141 includes an elliptical opening 143 formed in the circular bottom surface of the end plate 141, and a retaining hole 145 forming a disc-shaped space on the lower side of the elliptical opening 143.

The retention mechanism of the end plate 141 may be formed not only in the end plate 141 but also in at least one end portion of the filter 140 or in a member adjacent thereof.

The jig 147 to be retained by the retention mechanism of the end plate 141 is formed by fixing a retaining member 151 in an inverted T-shape on the leading end of a cylindrical support rod 149. The retaining member 151 is formed into an elliptical plate having a size slightly smaller than that of the elliptical opening 143 and a thickness slightly smaller than the height corresponding to the thickness of the retaining hole 145 formed in a disc-shaped space.

The jig 147 is inserted into the retaining hole 145 by adjusting the retaining member 151 to mate the opening 143 of the end plate 141. Next, the support rod 149 is turned by about 90 degrees so that the retaining member 151 cannot come out from the opening 143 and remain in side the retaining hole 145, as shown in FIG. 13.

To remove the jig 147 from the retention of the end plate 141, the retaining member 151 may be pulled out from the retaining hole 145 through the opening 143 by turning the support rod 149 so that the retaining member 151 can match the opening 143, and pulling out the retaining member 151 when the retaining member 151 and the opening 143 matches.

Figure 7:
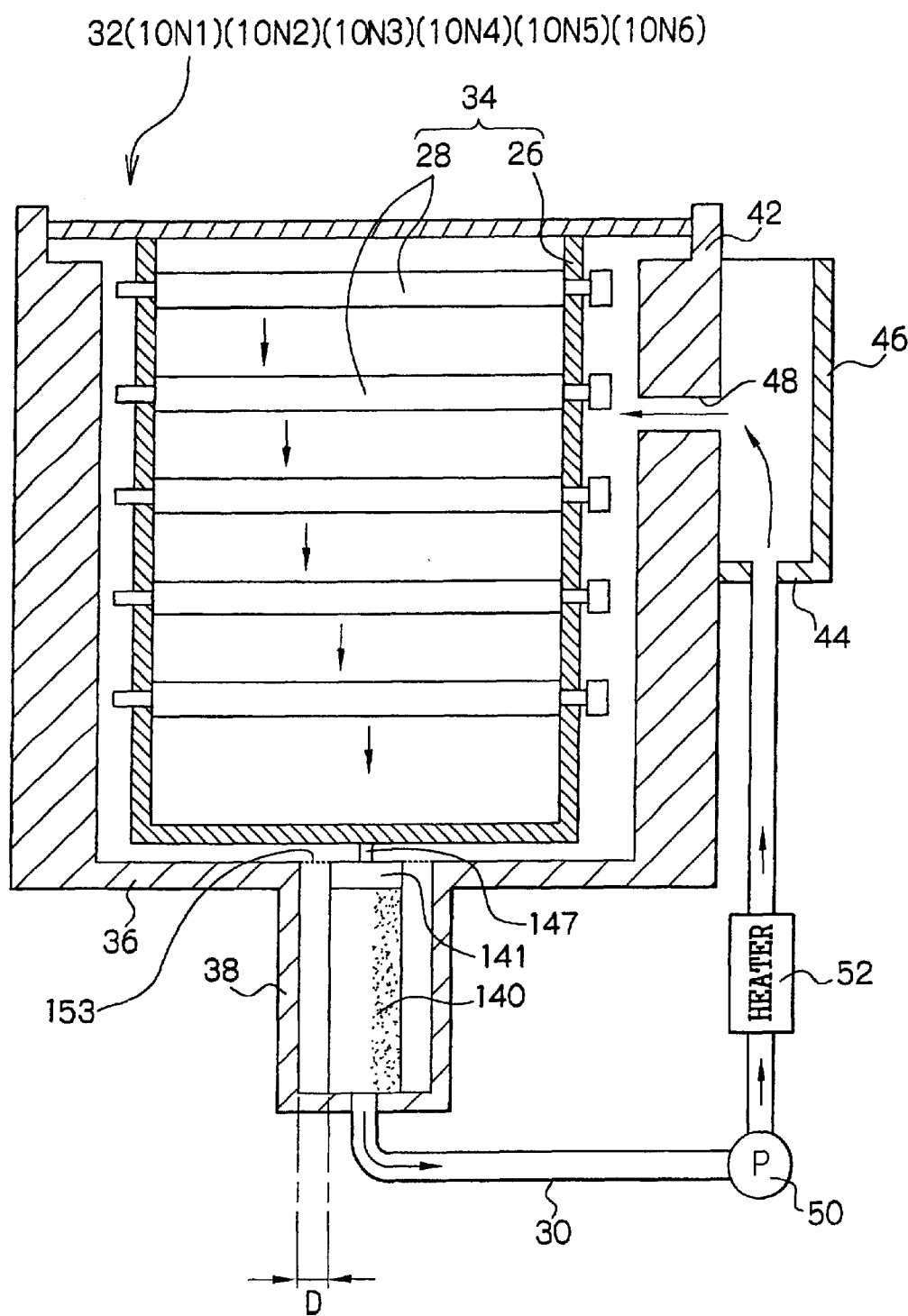
FIG. 7 is a schematic view showing in cross section a tank body in a photosensitive material processing apparatus according to a fifth embodiment of the invention.
Figure 11:
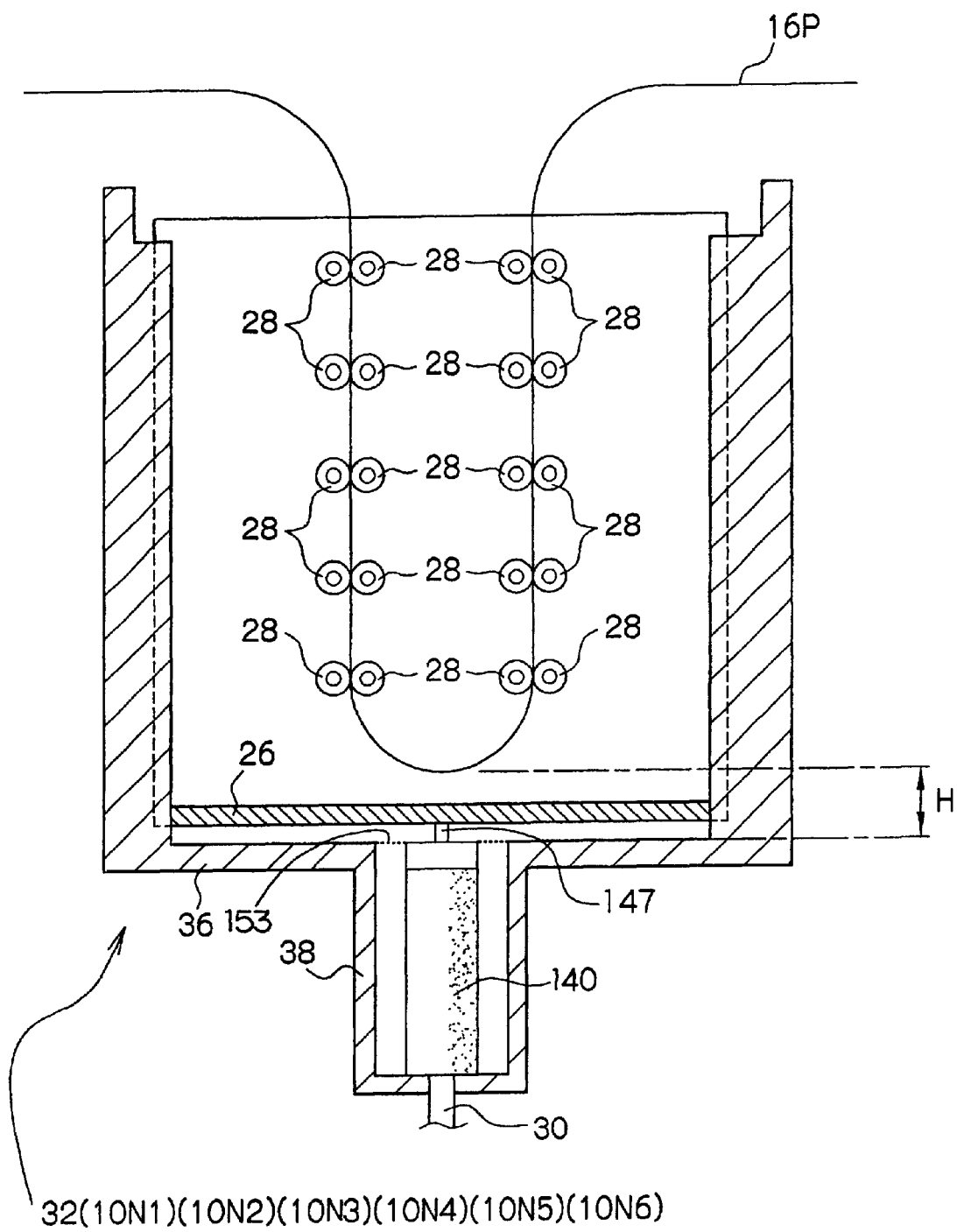
FIG. 11 is a schematic view showing in cross section the tank body in the photosensitive material processing apparatus according to the fifth embodiment of the invention.
Figure 12:
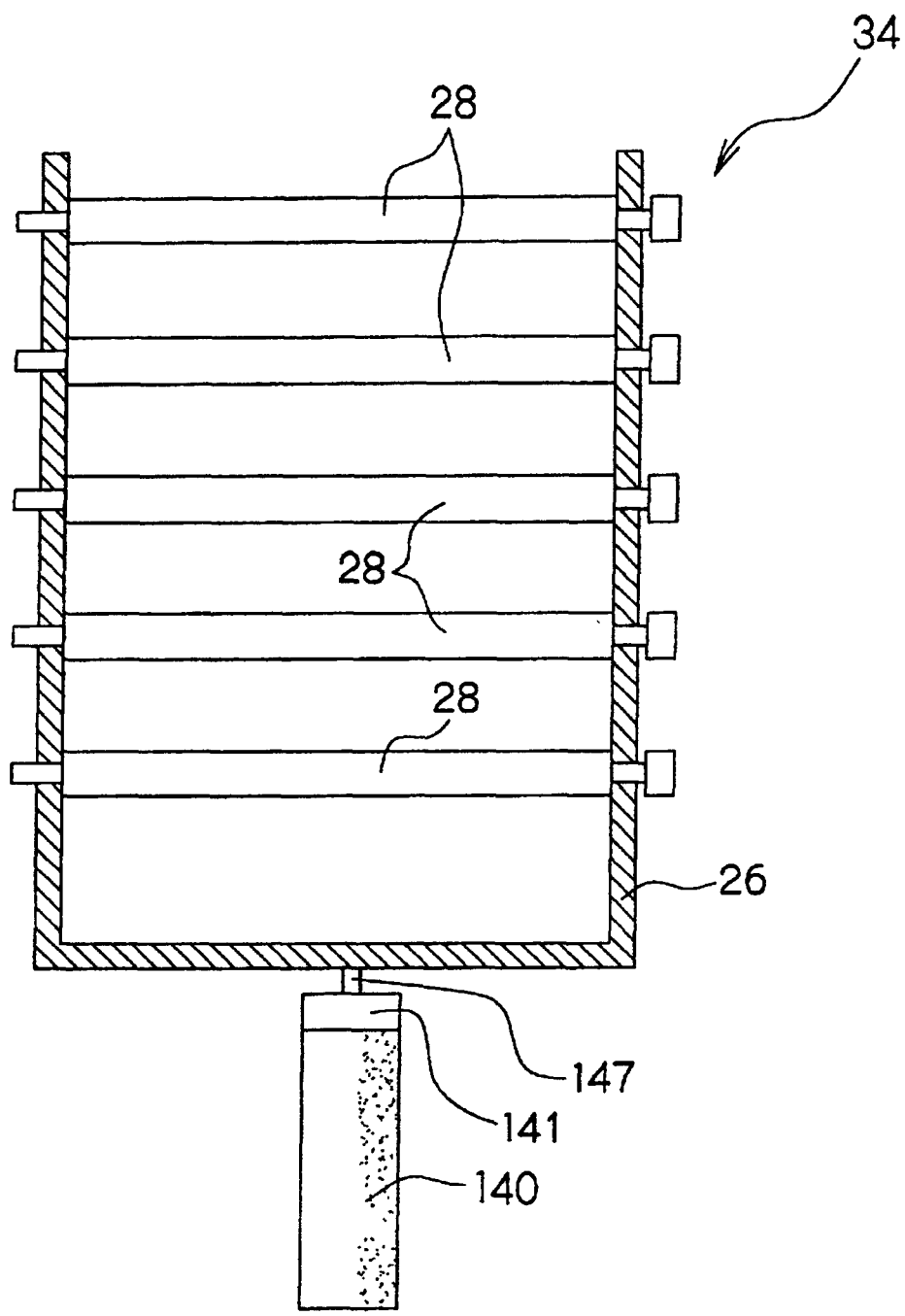
FIG. 12 is a schematic view showing in cross section a processing rack mounted in the tank body in the photosensitive material processing apparatus according to the fifth embodiment of the invention.

With the support rod 149 of the jig 147 being fixed on the frame 26 of the processing rack 34, as shown in FIGS. 7, 11 and 12, the processing rack 34 and the filter 140 can be handled as a single component by attaching the filter 140 to the jig 147.

Specifically, integrating the processing rack 34 with the filter 140 as described above, mounting in the processing rack 34 or removing the processing rack 34 from the tank body 32 and mounting the filter 140 or removing the filter 140 from the auxiliary chamber 38 can be carried out at the same time.

The filter 140 is mounted in the auxiliary chamber 38 and is dipped in the processing solution. Therefore, it was a troublesome job, since the operator had to put his/her hands into the processing solution and soil their hands.

However, if the filter 140 is integrally attached to the processing rack 34 by the jig 147, the filter 140 can be pulled out from the processing solution of the tank body 32 by pulling up the processing rack 34 out from the processing solution of the tank body 32.

As a result, the operator can change or maintenance the filter 140 after pulling the filter 140 out from the processing solution with the processing rack 34. Thus, not only reducing the potential to soil the operator's hands or the processing solution but also to facilitate the operation to change or maintenance the filter 140.

Here, the filter 140 may be constructed separately from the processing rack 34 and disposed as a single member in the auxiliary chamber 38. In this case, the support rod 149 of the jig 147 is elongated to have the retaining member 151 fixed on its leading end. The operator may mount the filter 140 in, and remove the filter 140 from the auxiliary chamber 38 of the tank body 32 by using the long jig 147.

Moreover, the filter 140 may be subjected to an antibacterial processing or made of an antibacterial material to prevent the various bacteria or algae from propagating in the filter 140 dipped in the processing solution or to prevent microorganisms from propagating when fed with paper powder or gelatin adhering to the filter 140.

Figure 9:
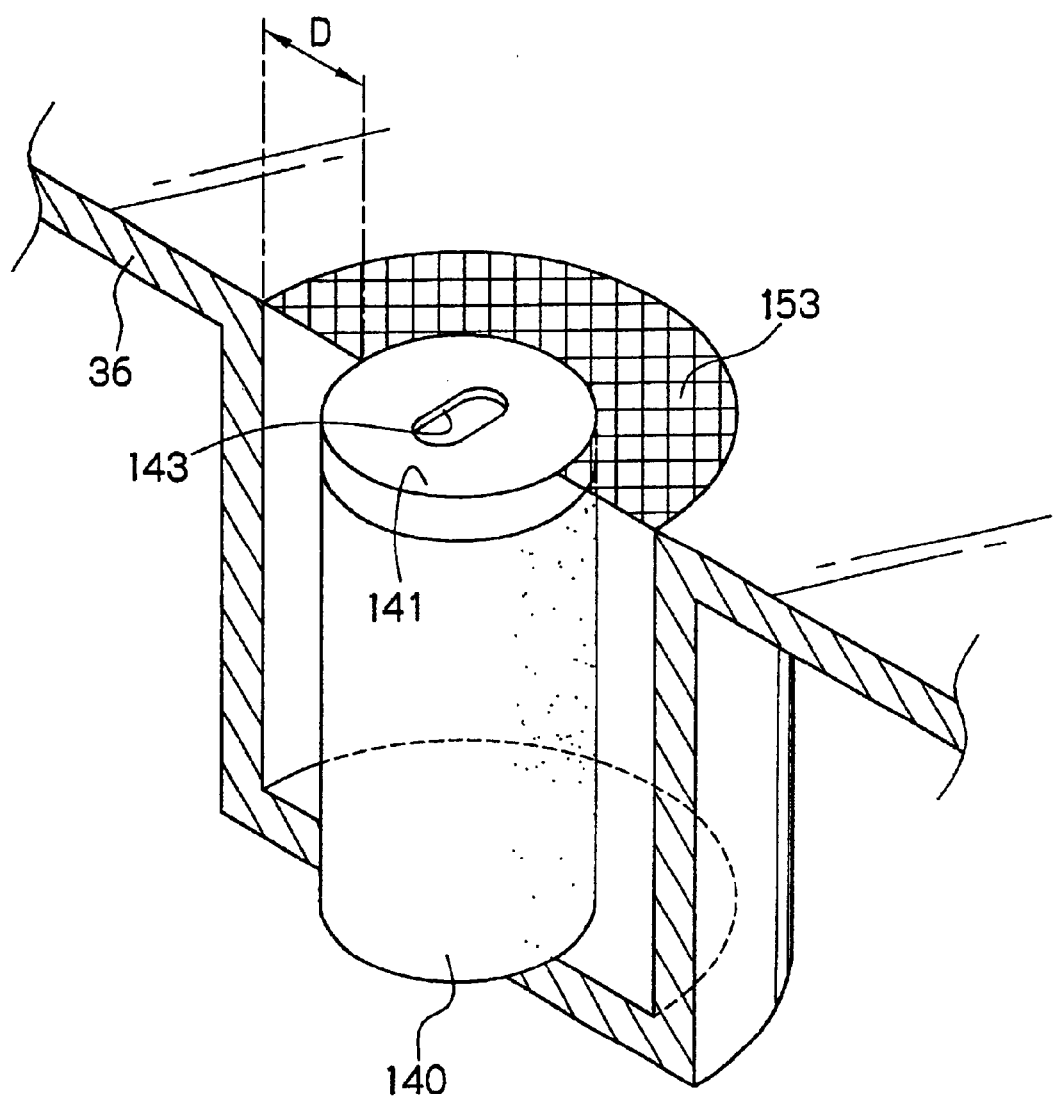
FIG. 9 is an enlarged perspective view showing an auxiliary chamber disposed in the tank body in the photosensitive material processing apparatus according to the fifth embodiment of the invention.

In the tank body 32, as shown in FIGS. 7, 9 and 11, the space between the upper surface of the end plate 141 and the circumference of the opening of the auxiliary chamber 38 is sealed with a drop stopper 153 when the filter 140 is disposed in the auxiliary chamber 38.

This drop stopper 153 is formed as a drain board or netted member having a ring shape such that the processing solution can easily flow therethrough but receives small-sized parts. The drop stopper 153 is mounted to cover the opening between the upper surface of the end plate 141 and the circumference of the opening of the auxiliary chamber 38. The drop stopper 153 may be integrally formed with and extend from the end plate 147 in a flange shape.

Constructing the drop stopper as described above, even if small-sized parts drop into the tank body 32 when the processing rack 34 is pulled out for maintaining the tank body 32, the parts are received by the drop stopper 153 and can be prevented from dropping into the auxiliary chamber 38.

Thus, even if small-sized parts drop into the tank body 32, the operator can easily recover the parts by picking them up from the drop stopper 53 or from the bottom surface. Without the drop stopper 153, small parts may drop into the narrow space between the filter 140 in the auxiliary chamber 38, and may be difficult to find the small parts therefrom. Further, if the filter 140 is carelessly removed from the auxiliary chamber 38, small parts which have been dropped or the dust particles may flow into the circulatory conduit 30 thereby to cause contamination or breakage to the inside of the circulatory conduit 30 or the pump 50 or the heater 52.

By thus arranging the drop stopper 153 in the clearance between the auxiliary chamber 38 and the filter 140, however, it is possible not only to prevent the small parts from being lost but also to prevent the small parts from erroneously entering the circulatory conduit 30 to cause troubles.

Figure 10:
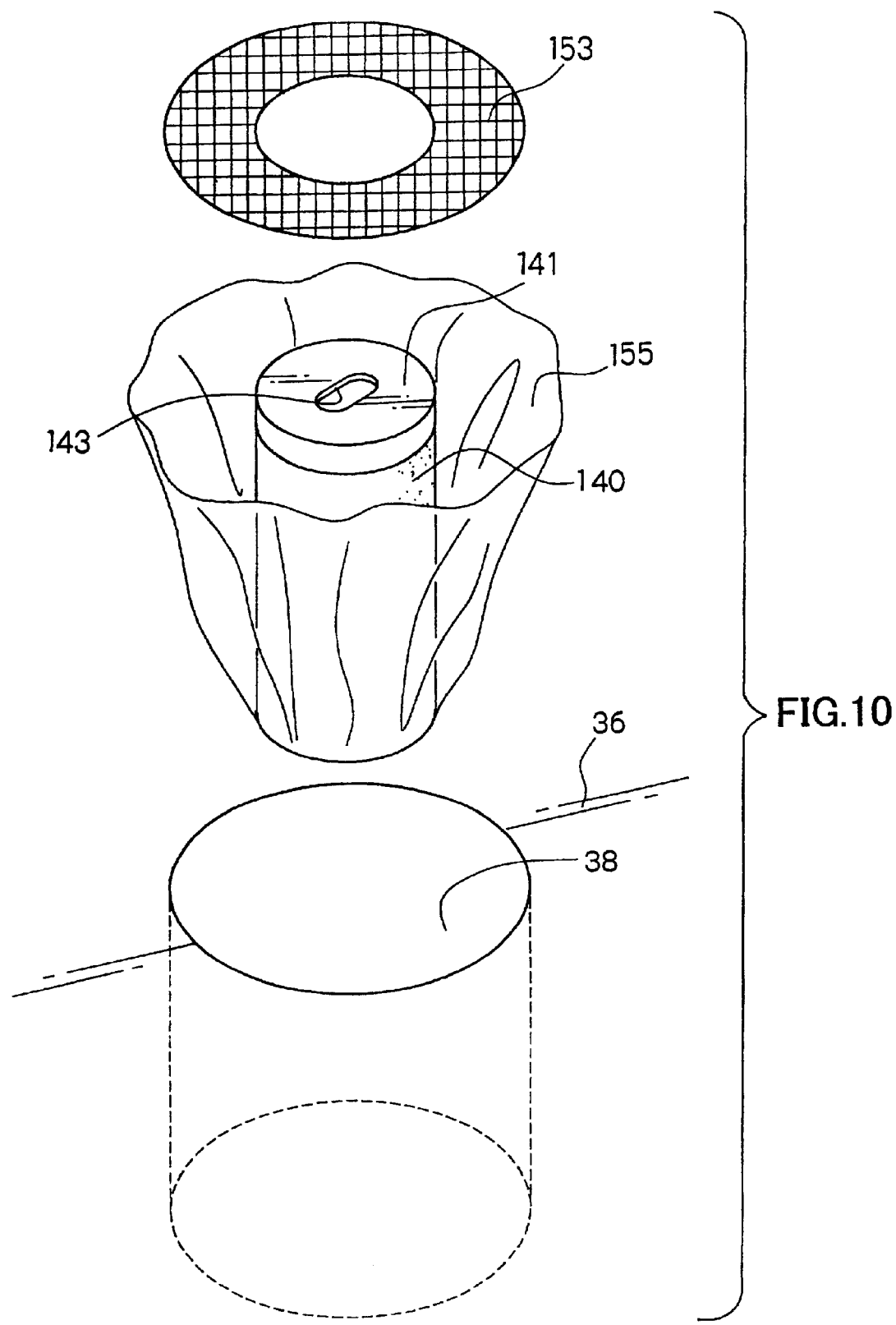
FIG. 10 is an exploded perspective view showing main components of an auxiliary chamber including a filter and disposed in the tank body in the photosensitive material processing apparatus according to the fifth embodiment of the invention.

As shown in FIG. 10, the filter 140 may be provided with a dust receiving member 155. This dust receiving member 155 is made of a sheet-shaped flexible member. The dust receiving member 155 is disposed to expand around the filter 140 from the bottom surface of the filter 140 which will be connected to the opening of the circulatory conduit 30, thereby to enclose the filter 140. Moreover, the dust receiving member 155 is provided, at the portion corresponding to the bottom surface of the filter 140, with a hole to be connected to the opening of the circulatory conduit 30.

When the dust receiving member 155 is disposed together with the filter 140 in the auxiliary chamber 38, it is mounted closely along the inner circumference of the auxiliary chamber 38, and the circumference edge of an open end of the dust receiving member 155 contacts with the circumference edge of the opening of the auxiliary chamber 38, i.e., the boundary between the auxiliary chamber 38 and the bottom surface 36. Moreover, the part drop preventing member 153 is arranged to cover the area between the circumference edge of the open end of the dust receiving member 155 which is attached to the circumference edge of the opening of the auxiliary chamber 38 and the circumference of the end plate 141.

When the filter 140 is to be replaced, the drop stopper 153 is removed, and the outer circumferential portion of the filter 140 is enclosed with the dust receiving member 155. Then, the filter 140 is detached together with the dust receiving member 155 from the inner side of the auxiliary chamber 38.

By thus removing the used filter 140, it is possible to prevent the dust particles having adhering to the outer circumference of the filter 140 from being peeled off while the removing operation and from dropping into the auxiliary chamber 38. Further, it is possible to prevent the dust particles dropping into the circulatory conduit 30 and from contaminating or damaging the inside of the circulatory conduit 30 and the pump 50 and the heater 52.

A new separate member may be prepared as the dust receiving member 155, however, the wrapping sheet enclosing the new filter 140 can also be partially cut away and shaped so that the shaped sheet can be used as the dust receiving member 155 thereby to save the resources.

In the tank body 32 thus constructed, the processing solution passes through the drop stopper 153 into the auxiliary chamber 38 until it is sucked through the filter 140 into the opening of the circulatory conduit 30.

When the pump 50 is driven in each processing solution tank 10N1 (10N2, 10N3, 10N4, 10N5 or 10N6), the processing solution of the lower region in the tank body 32 is circulated by being sucked through the auxiliary chamber 38 and the filter 140 into the circulatory conduit 30, discharged to the subtank 46 after heated to a predetermined temperature by the heater 52, and by being discharged through the through hole 48 into the upper region of the tank body 32. In the present embodiment, the circulation flow rate (or the actual flow rate of the pump) of the processing solution in the circulatory conduit 30 is set to be at a rate of 1 to 10 liters/min. by the pump 50.

In the processing solution circulating and purifying system of each processing solution tank 10N1 (10N2, 10N3, 10N4, 10N5 or 10N6), the subtank 46 is provided with the processing solution which has been pressurized by the pump 50 and temperature-adjusted by the heater 52. Then, the processing solution in the subtank 46 flows out into the upper region in the tank body 32 through the through hole 48.

Then, the processing solution provided to the upper region in the tank body 32 flows downward from the upper region to the lower region in the tank body 32. Moreover, the processing solution in the lower region flows into the auxiliary chamber 38 and the dust particles are removed and purified, while the processing solution is being sucked through the filter 140 into the circulatory conduit 30.

Here will be described the structural conditions of the present embodiment for subjecting the color paper 16P to a proper solution processing by circulating the processing solution in the tank body 32 properly.

Figure 8:
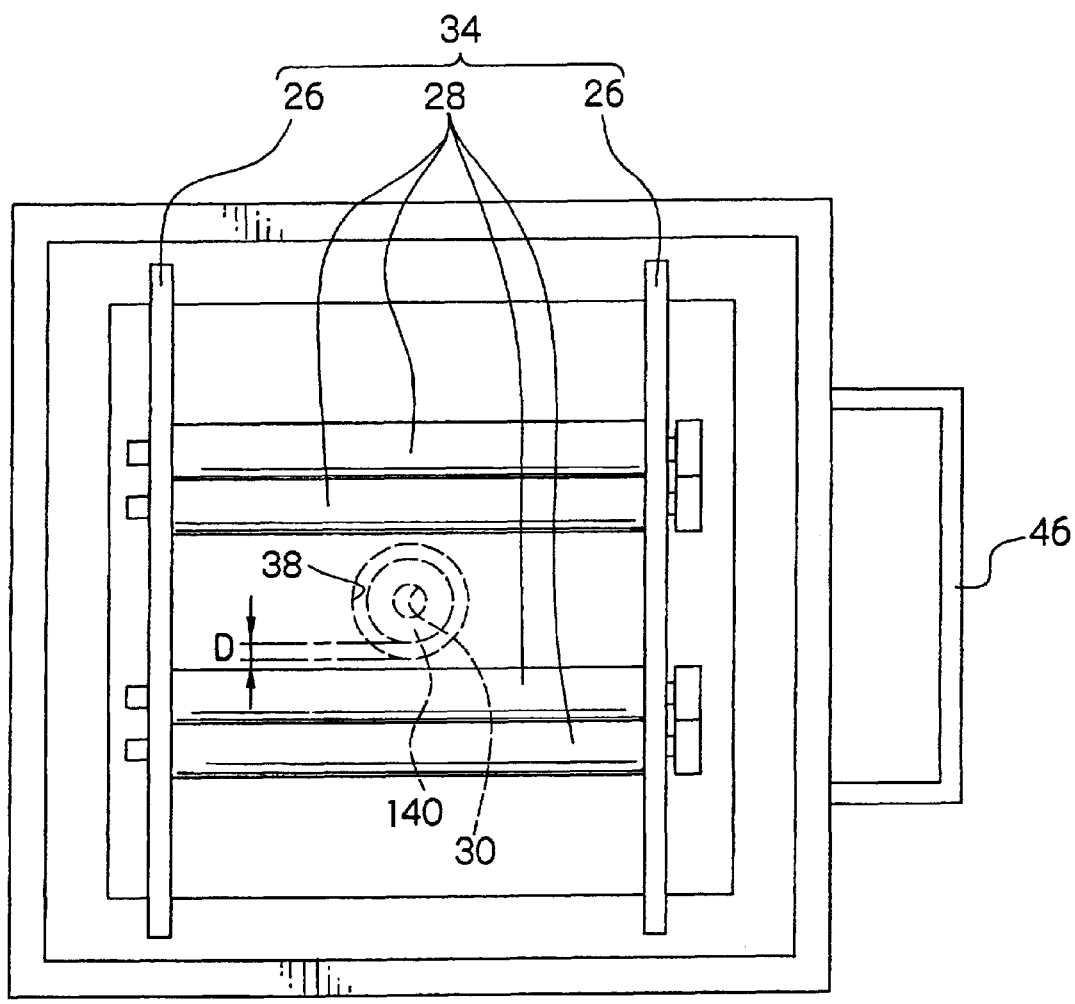
FIG. 8 is a schematic top plan view showing the tank body in the photosensitive material processing apparatus according to the fifth embodiment of the invention.

In the tank body 32, as shown in FIGS. 8 and 9, the filter 140 is arranged in the auxiliary chamber 38 on the bottom surface side. If the distance D between the inner circumference of the auxiliary chamber 38 and the outer circumference of the filter 140 is excessively small, cavitation may occur in the pump 50 when the processing solution is circulated in the processing solution circulating and purifying system by the circulatory conduit 30.

When cavitation occurs in the pump 50, sulfuric compounds in the processing solution sulfurize, and accelerates deterioration of the processing solution.

When the circulation flow rates (the actual flow rates of the pump) corresponding to the ordinary usable range for circulating the processing solution actually in the tank body 32 are set to 3 liters/min., 6 liters/min., 10 liters/min. or 20 liters/min., therefore, experiments were done for investigating the situations of occurrence of the cavitation in the pump 50 by setting the distance D to 3 mm, 5 mm or 7 mm between the inner circumference of the auxiliary chamber 38 and the outer circumference of the filter 40. The results of the experiments are tabulated in FIG. 15A.

When the distance D was changed to 3, 5 and 7 mm for the circulation flow rate of 3 liters/min., it is found from FIG.

15A that the pump 50 could be run with little cavitation for the distance D of 3 mm. For the distance D was 5 or 7 mm, moreover, it is found that the pump 50 could be run in a satisfactory state with no cavitation.

Next, when the distance D was changed to 3, 5 and 7 mm for the circulation flow rate of 6 liters/min., the result is that the cavitation occurred for the distance D of 3 mm. For the distance D of 5 or 7 mm, however, the result is that the pump 50 could be run in a satisfactory state with no cavitation.

Next, when the distance D was changed to 3, 5 and 7 mm for the circulation flow rate of 10 liters/min., the bad result is that the cavitation occurred for the distance D of 3 mm. For the distance D of 5 mm, the result is that the pump 50 could be run with little cavitation. For the distance D of 7 mm, the result is that the pump 50 could be run in a satisfactory state with no cavitation.

Next, when the distance D was changed to 3, 5 and 7 mm for the circulation flow rate of 20 liters/min., the result is that the occurrence of cavitation was prominent for the distance D of 3 mm. For the distance D of 5 mm, moreover, the result is that the cavitation occurred. For the distance D of 7 mm, still moreover, the result is that the cavitation might occur but within an allowable range.

It is, therefore, preferable that the distance D between the inner circumference of the auxiliary chamber 38 and the outer circumference of the filter 140 in the tank body 32 is 5 mm or more, and it is more preferable that the distance D is 10 mm or more.

Figures 15A, 15B:
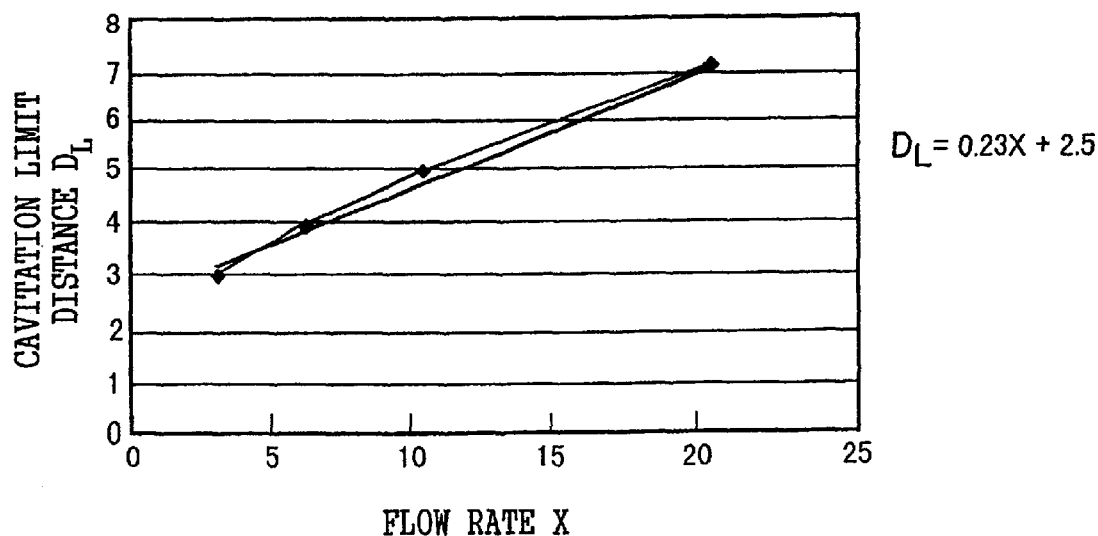
FIG. 15A is a table showing results of experiments of states giving rise to cavitations in a pump for circulating the processing solution by changing a distance between a side of the auxiliary chamber of the tank body and a side surface of the filter of the photosensitive material processing apparatus according to the fifth embodiment of the invention.
FIG. 15B is a graph in which the results of FIG. 15A are shown by plotting a limit distance $D_L$ for cavitations to occur against a circulation flow rate X of the processing solution.

By using the aforementioned results, as illustrated in FIG. 15B, the limit distance $D_L$, at which the cavitation occurs, is graphically plotted against the actual flow rate [liters/min.] X of the pump or the circulation flow rate of the processing solution. It has been found from the graph that the following relation holds.

Relation A:

$$D > 0.23X + 2.5,$$

wherein:

D: Distance [mm] taken from the inner circumference of the auxiliary chamber to the outer circumference of the filter; and X: Actual flow rate [liters/min.] of the pump.

If the circulation flow rate X of the processing solution in the tank body 32 is set, therefore, the limit distance $D_L$ for the cavitation to occur is determined so that the design can be made by properly setting the distance D between the inner circumference of the auxiliary chamber 38 and the outer circumference of the filter 140.

In the processing solution tank 32, as shown in FIG. 11, the filter 140 is arranged in the auxiliary chamber 38 on the bottom surface side of the tank body 32. If the height H from the filter 140 to the color paper 16P or the photosensitive material being conveyed by the processing rack 34 is excessively small, there may occur a disadvantage that the dust particles or the like growing to extend from the side of the filter 140 adhere to the surface of the color paper 16P thereby to damage the color paper 16P or to cause unevenness in the developing processing.

If the height H or the shortest distance from the filter 140 to the color paper 16P being conveyed by the processing rack 34 is excessively large, on the contrary, it deteriorates the efficiency for the filter 140 to adsorb and remove the dust particles which reside in the processing solution in the vicinity of the turning lower end of the color paper 16P.

In the tank body 32, therefore, experiments to investigate the developing state of the photosensitive material and the state of the dust particle recovering ability by the filter 140 were conducted by setting the height H or the shortest distance from the filter 140 to the photosensitive material being conveyed by the processing rack 34, i.e., the color paper 16P to 0 to 5 mm, 5 to 25 mm, 25 to 100 mm, and over 100 mm. The results of the experiments are tabulated in FIG. 16.

When the height H or the shortest distance from the filter 140 to the color paper 16P being conveyed by the processing rack 34 was set to 0 to 5 mm, it is found from FIG. 16 that the bacteria and the dust particles having grown as algae to 5 mm or more from the upper surface of the filter 140 adhered, after use of a long time, to the surface of the color paper 16P thereby to cause bad results to damage the color paper 16P or to make processing unevenness.

Next, for the height H of 5 to 25 mm, even after use of a long time, the algae, as might otherwise have grown from the bacteria or the dust particles, did not adhere from the upper surface of the filter 140 to the surface of the color paper 16P so that neither the surface of the color paper 16P was damaged nor made processing unevenness.

In the vicinity of the turning portion of the color paper 16P in the lower region of the tank body 32, moreover, the dust particles in the processing solution could be adsorbed and efficiently eliminated by the filter 140 to produce a remarkably excellent result that the filter 140 could exhibit its performance most efficiently.

Next, for the height H of 25 to 100 mm, even after use of a long time, the algae, as might otherwise have grown from the bacteria or the dust particles, did not adhere from the upper surface of the filter 140 to the surface of the color paper 16P in the least so that neither the surface of the color paper 16P was damaged nor made processing unevenness.

In the vicinity of the turning portion of the color paper 16P in the lower region of the tank body 32, moreover, the dust particles in the processing solution could be adsorbed to the filter 140, but the adsorption efficiency was rather lowered, to produce a satisfactory result that no practical problem rose in use although the amount of the dust particles recovered decreased.

Next, for the height H over 100 mm, even after use of a long time, the algae, as might otherwise have grown from the bacteria or the dust particles, did not adhere from the upper surface of the filter 140 to the surface of the color paper 16P in the least so that neither the surface of the color paper 16P was damaged nor made processing unevenness.

In the vicinity of the turning portion of the color paper 16P in the lower region of the tank body 32, however, there is lowered the action to adsorb the dust particles in the processing solution to the filter 140 thereby to clear them. As a result, the dust particles having a buoyancy could not be adsorbed to the filter 140 at a lower position against the buoyancy while being carried on the water flow, thereby to produce a bad result that the recovery efficiency of the dust particles was lowered to decrease the amount of dust particles recovered.

Therefore, the result obtained is that the height H or the shortest distance in the tank body 32 from the filter 140 to the color paper 16P or the photosensitive material being conveyed by the processing rack 34 is preferably 5 to 100 mm and more preferably 5 to 25 mm.

Sixth Embodiment

A sixth embodiment of the invention will now be described. Components that are substantially the same as components described in previous embodiments are designated by the same reference numerals, and description thereof is omitted.

Figure 17:
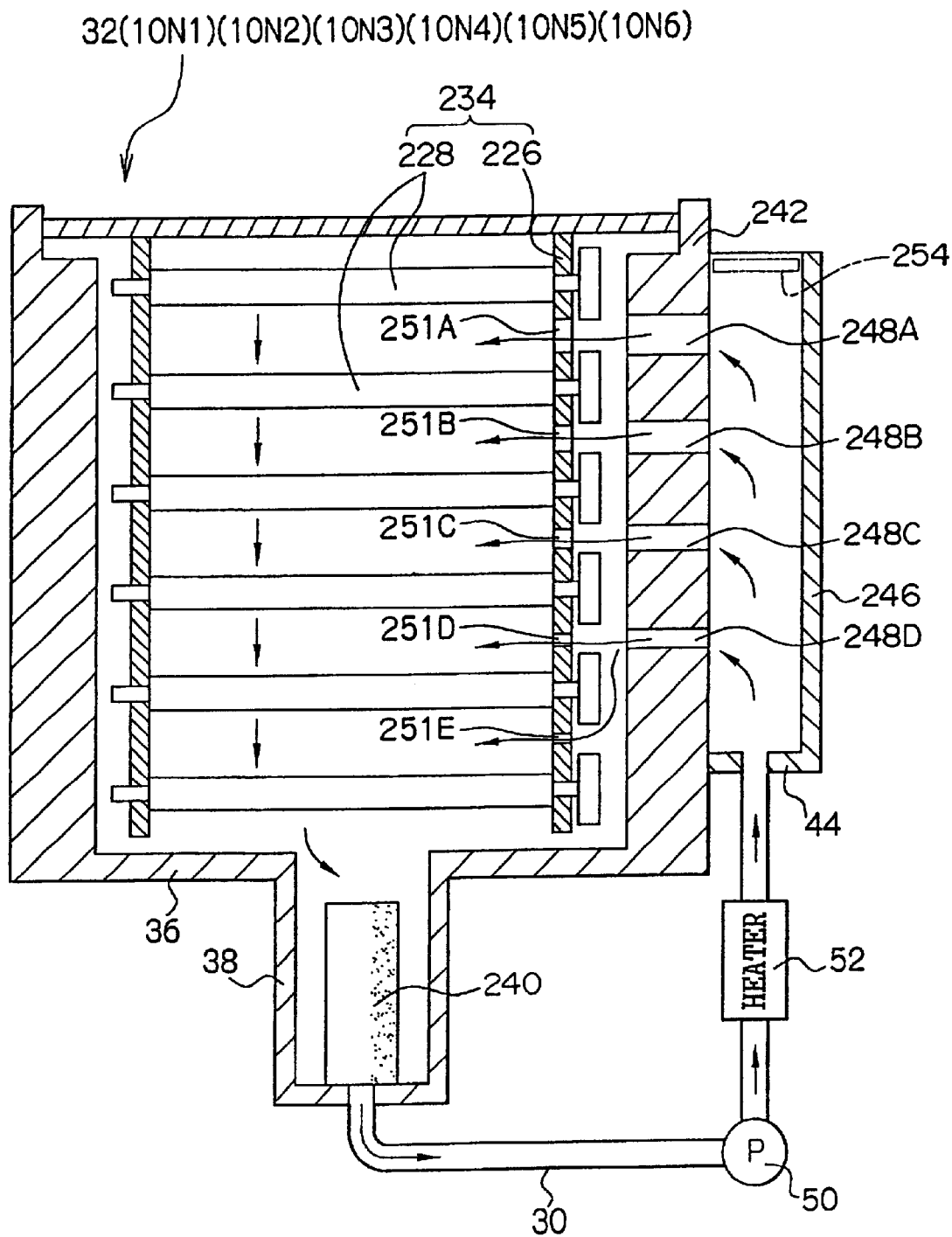
FIG. 17 is a schematic view showing a tank body in a photosensitive material processing apparatus according to a sixth embodiment of the invention.
Figure 18:
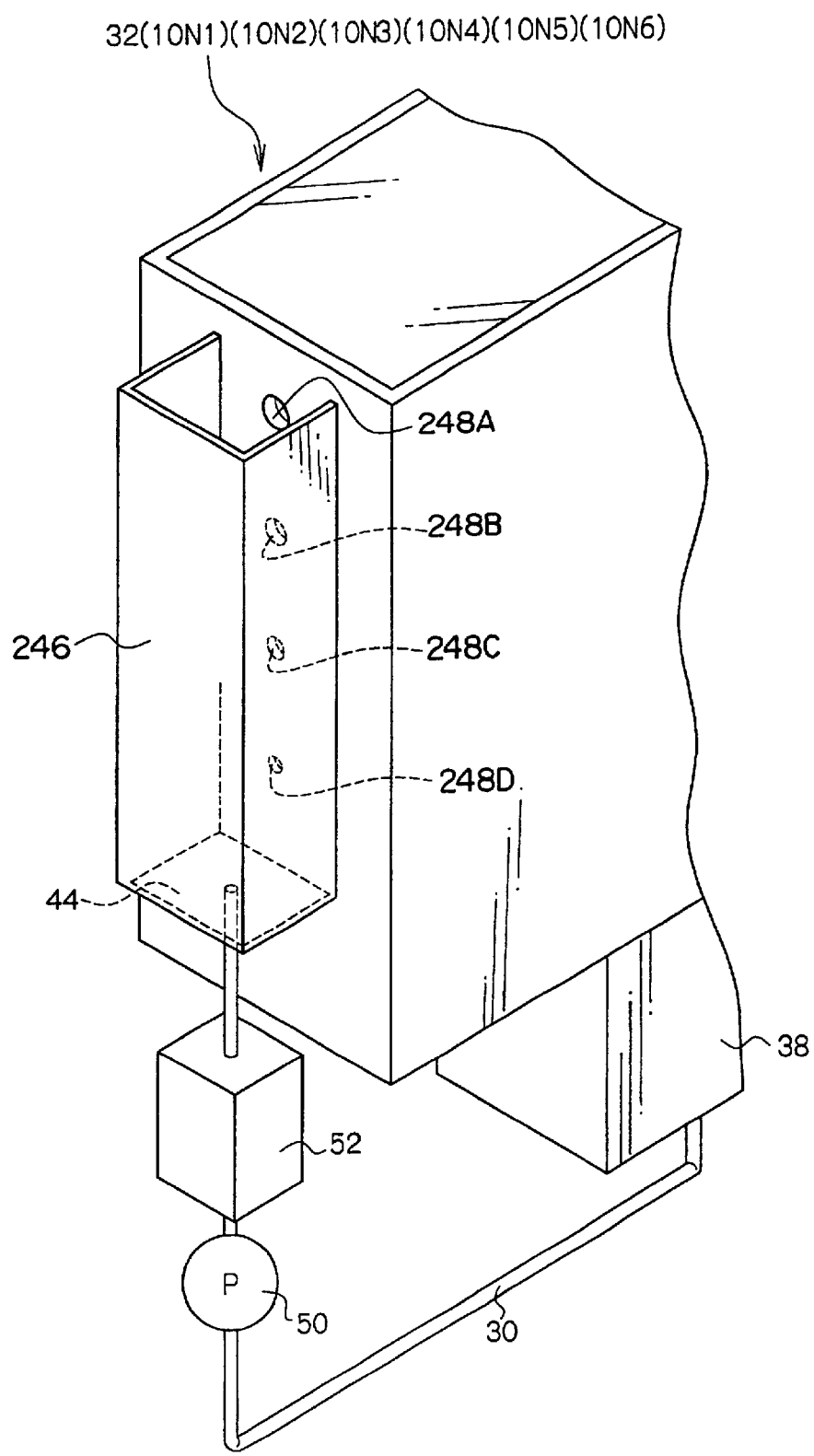
FIG. 18 is a perspective view of main components of the tank body in the photosensitive material processing apparatus according to the sixth embodiment of the invention.

As shown in FIGS. 17 and 18, the tank body 32 of the sixth embodiment is integrally provided with a subtank 246 which extends so long over a predetermined portion from the upper portion to the lower portion of the vertical side wall 242 as to have a depth of one half or more of that of the tank body 32, so that the subtank 246 may form a part of the processing solution tank processing solution circulating path.

In the wall portion to be dipped in the processing solution between the subtank 246 and the tank body 32 at a plurality of predetermined positions (e.g., at four equidistant portions in the present embodiment) from the upper portion to the lower portion of the wall portion, there are formed a plurality of (e.g., four in the present embodiment) through holes 248A, 248B, 248C and 248D which individually provide communication between the inside of the subtank 246 and the inside of the tank body 32, so as to form a portion of the processing solution tank processing solution circulating path.

These four through holes 248A, 248B, 248C and 248D are constructed to have sectional areas made sequentially smaller in the direction from the upper portion to the lower portion of the vertical side wall 242.

Specifically, the processing solution in the subtank 246 flows into the tank body 32 through the individual through holes 248A, 248B, 248C and 248D which are arranged over the predetermined portions from the upper portion to the lower portion of the vertical side wall 242. The sectional areas of the individual through holes 248A, 248B, 248C and 248D are set so that the processing solutions to flow into the tank body 32 through the individual through holes 248A, 248B, 248C and 248D may take substantially equal flow velocities and flow rates.

As a result, the processing solution, as purified, heated and temperature-adjusted, in the subtank 246 can be evenly fed out to the tank body 32 and can be wholly mixed uniformity with the processing solution existing in the tank body 32 while being distributed to every corners of the tank body 32.

Therefore, the individual through holes 248A, 248B, 248C and 248D are set to have proper sectional shapes (as circularly or rectangularly opened) and areas.

In order that the processing solution is discharged through the individual through holes 248A, 248B, 248C and 248D from the subtank 246 into the tank body 32 may flow to every corners of the tank body 32, too, there are formed in the frame 226 of a processing rack 234 a plurality of (e.g., five in the present embodiment) through holes (having an elliptical shape in a front view) 251A, 251B, 251C, 251D and 251E for passing the processing solution therethrough.

The individual through holes 251A, 251B, 251C, 251D and 251E are opened at positions in the same height of those of the corresponding individual through holes 248A, 248B, 248C and 248D, respectively, and are formed in the vertical side wall 242. That is, at the positions located ahead for the processing solutions spurted from the individual through holes 248A, 248B, 248C and 248D to flow to, and are so formed at portions between the individual stems of individual conveyance rollers 228 in the frame 226 as not to deteriorate the strength of the frame 226, so that the processing solutions spurted from the individual through holes 248A, 248B, 248C and 248D may easily reach the side wall portions opposed to the vertical side wall 242 of the tank body 32.

Figure 19:
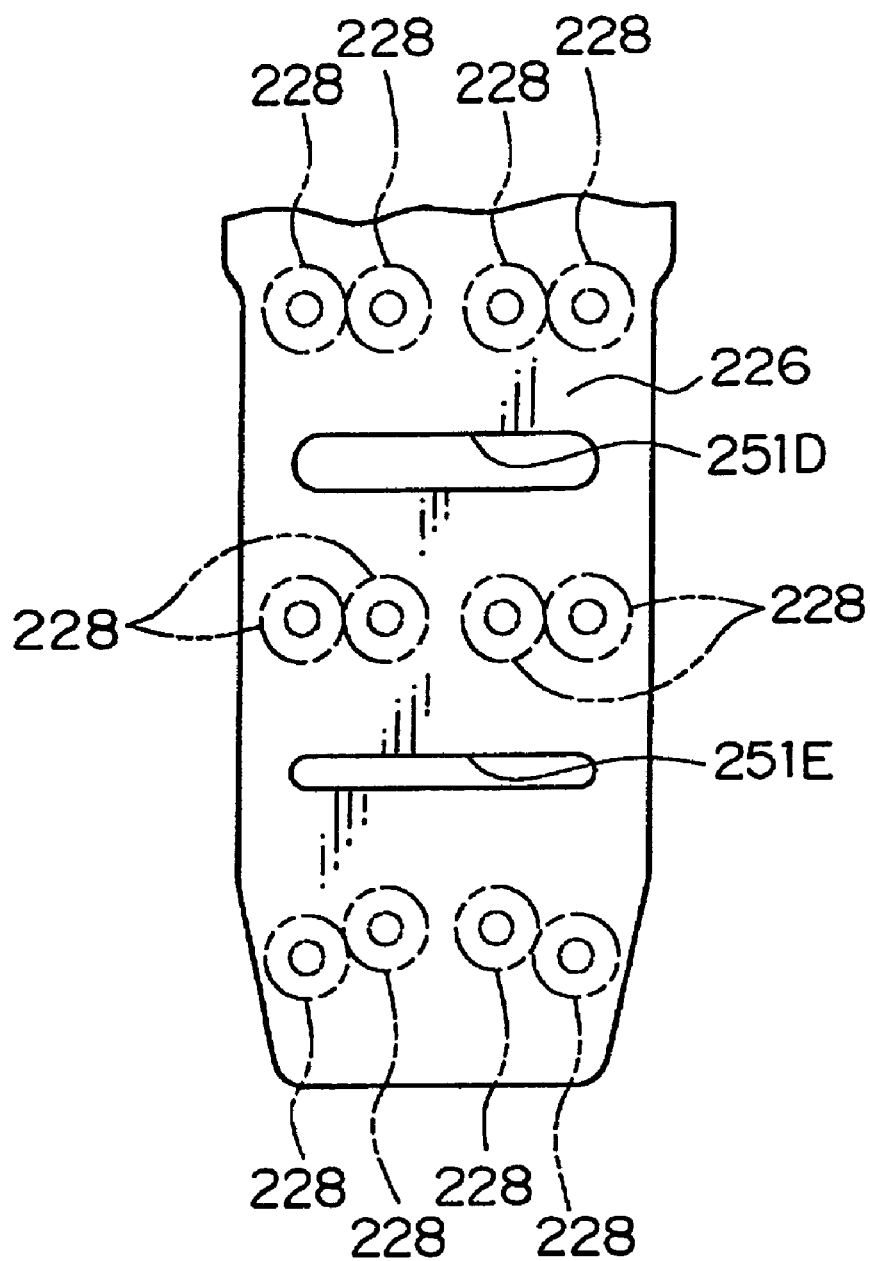
FIG. 19 is an enlarged side view of a main part of a frame of a processing rack in the photosensitive material processing apparatus according to the sixth embodiment of the invention.

As shown in FIGS. 17 and 19, moreover, the individual through holes 251A, 251B, 251C, 251D and 251E are formed to have their sectional areas gradually reduced from the upper portion to the lower portion of the frame 226 (i.e., in the direction for the processing solution contained in the tank body 32 to become deeper).

Specifically, the sectional areas are set so that the processing solution having passed from the subtank 246 through the individual through holes 248A, 248B, 248C and 248D and being charged in the tank body 32 may pass through the individual through holes 251A, 251B, 251C, 251D and 251E having the sectional areas sequentially reduced from the upper portion to the lower portion in the frame 226 and further through the clearances between the individual conveyance rollers 228, and that the individual processing solutions may easily flow at substantially equal flow velocities and flow rates in the individual through holes 251A, 251B, 251C, 251D and 251E to the vertical side portion, as opposed to that having the subtank 246, of the tank body 32.

As a result, over the long range in the depth direction from the upper portion to the lower portion of the vertical side wall 242 between the subtank 246 and the tank body 32, the processing solution evenly flows out from the side of the subtank 246 toward the tank body 32 by the individual through holes 248A, 248B, 248C and 248D. Over the long range in the depth direction from the upper portion to the lower portion of the frame 226, moreover, the processing solution is caused to pass evenly through the individual through holes 251A, 251B, 251C, 251D and 251E so that the processing solution, as purified, heated and temperature-adjusted, in the subtank 246 can be wholly mixed evenly with the processing solution existing in the tank body 32 while being distributed to every corners of the tank body 32.

Therefore, these individual through holes 251A, 251B, 251C, 251D and 251E are set to have the proper sectional shapes (as elliptically or rectangularly opened) and areas.

Here in the processing solution tank processing solution circulating path, the processing solution, flowing at a flow rate of 1 to 7 liters/min. into the circulatory conduit 30 by the action of the pump 50, is heated to a predetermined temperature by the heater 52 and is discharged from the opening at the center of the bottom 44 into the subtank 246. Then, the processing solution flows through the individual through holes 248A, 248B, 248C and 248D into the tank body 32 and is distributed through the individual through holes 251A, 251B, 251C, 251D and 251E to every corners of the tank body 32 so that the processing solution is mixed uniformly with the processing solution existing in the tank body 32. Then, the processing solution in the lower region flows into the auxiliary chamber 38. Thus, these circulating actions are repeated.

In short, in the processing solution tank processing solution circulating path in these individual tank body 32 (i.e., 10N1, 10N2, 10N3, 10N4, 10N5 and 10N6), the processing solution, as pressurized by the pump 50 and temperature-adjusted by the heater 52, flows into the subtank 246. Then, the processing solution in the subtank 246 flows out into the tank body 32 through the individual through holes 248A, 248B, 248C and 248D.

Moreover, the processing solution, provided into the tank body 32, flows through the individual through holes 251A, 251B, 251C, 251D and 251E, and the processing solution, being mixed with the processing solution existing in the tank body 32, flows downward (as the downflow) from the upper region to the lower region. Moreover, the processing solution in the lower region flows into the auxiliary chamber 38 having the dust particles removed thereof and being purified, when it is sucked through the filter 240 into the circulatory conduit 30.

Moreover, the dust particles exceeding 30 microns, as might otherwise damage the photosensitive material, are trapped by the filter 240 so that they cannot easily float. At the time of circulating the predetermined processing solution in the tank body 32 or at the time of mounting/removing the processing rack 234, therefore, the floating of the dust particles exceeding 30 microns in the predetermined processing solution to damage the photosensitive material is suppressed to cause the damages on the surface of the photosensitive material, so that a stable processing performance to form an image having no defect on the photosensitive material can be kept.

In this tank body 32, as shown in FIG. 17, the processing solution is spurted from the bottom surface of the subtank 246 by the circulatory conduit 30. Because of a small volume of the subtank 246, the processing solution spurted from its bottom surface rises at a relatively high velocity to trouble the solution surface violently. Therefore, the processing solution may be early oxidized and degraded.

In this case, a floating cover 254 is desirably floated on the solution surface of the subtank 246 to prevent the solution surface from being troubled and to reduce the open area (i.e., the area for the processing solution to be exposed to the air) of the solution surface of the subtank 246.

Seventh Embodiment

A seventh embodiment of the invention will now be described with reference to FIG. 20. Components that are substantially the same as components described in previous embodiments are designated by the same reference numerals, and description thereof is omitted.

According to the construction of this seventh embodiment, when the processing solution is fed from the subtank 246 through the individual through holes 248A, 248B, 248C and 248D into the tank body 32, the flow rates of the processing solutions to flow from those individual through holes 248A, 248B, 248C and 248D into the tank body 32 are made more equal to one another.

The vertical passage in the subtank 246 forming a part of the processing solution tank processing solution circulating path is constructed such that the horizontal sectional areas of the passage from the lower through hole 248D to the upper through hole 248A, as longitudinally arranged, are gradually reduced.

In short, the passage in the subtank 246 from the lower through hole 248D to the upper through hole 248A is formed into a shape of a right-angled triangle, as viewed in front elevation. Here, this shape may be formed in a desirably curved surface according to the state of the flow of the processing solution and the pressures at individual depths.

Figure 20:
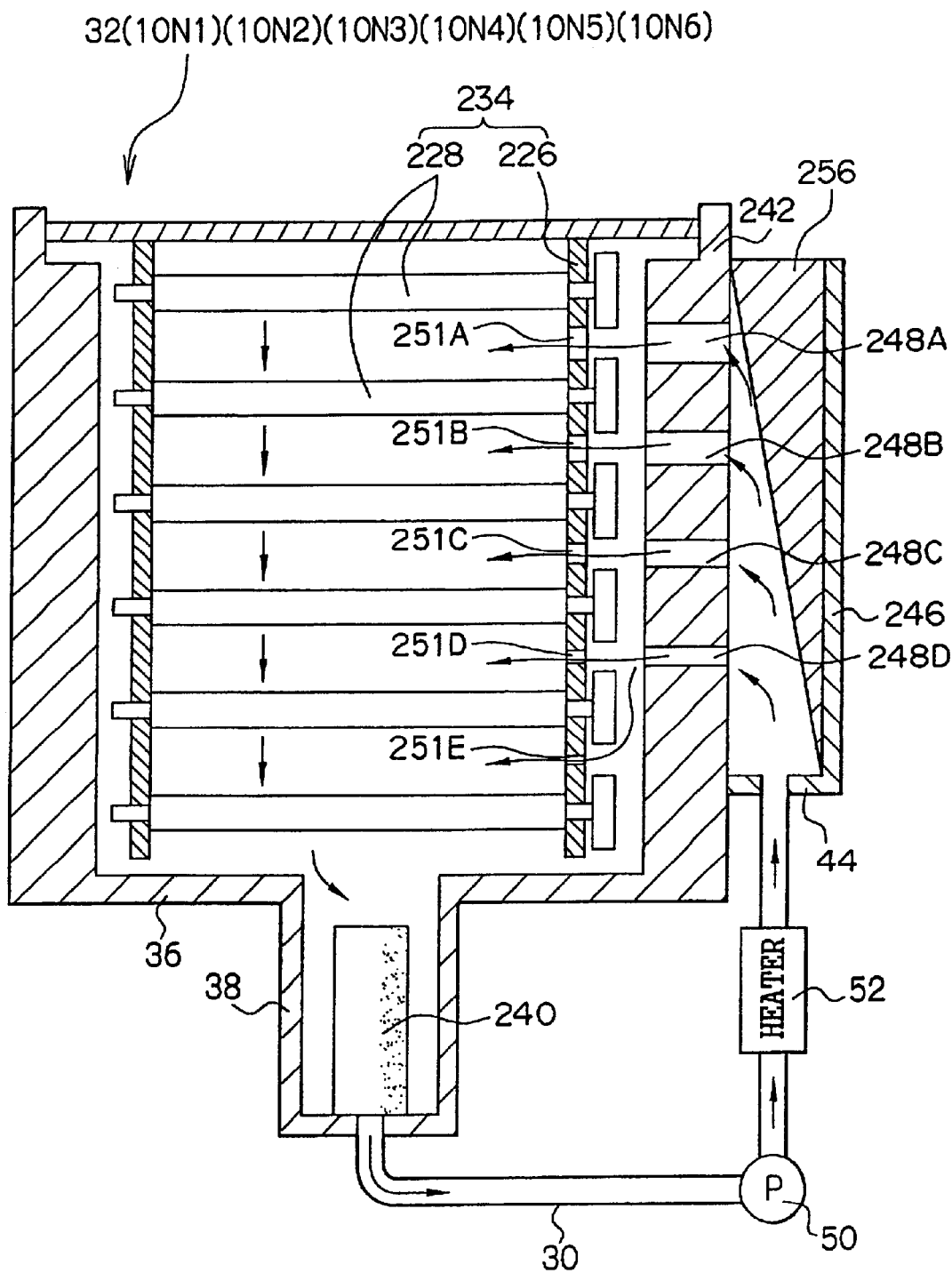
FIG. 20 is a schematic view showing a tank body in a photosensitive material processing apparatus according to a seventh embodiment of the invention.

In order to form such right-angled triangular passage in a front elevation, a passage forming member 256 having an inverted right-angled triangular shape is disposed in the subtank 246, as shown in FIG. 20. Here, it should be understood that the member 256 is not disposed for forming the right-angled triangular passage, but that the side wall constructing the side surface of the subtank 246 could be sloped to form the right-angled triangular passage, as viewed in the front elevation. Alternatively, the side wall may be formed in a desired curved surface according to the flow state of the processing solution and the pressures at individual depths.

With the passage in the subtank 246 being thus constructed, the processing solution spurted from the circulatory conduit 30 to the bottom portion of the subtank 246 flows in the subtank 246 at a low flow velocity in the portion of the lower through hole 248D and at a higher velocity toward the upper through hole 248A.

Therefore, the processing solution charged in the subtank 246 acts to equalize the flow velocities and rates of the processing solutions to flow into the individual through holes 248A, 248B, 248C and 248D, more from the upper portion to the lower portion of the subtank 246, as taken in the vertical direction.

Even when the individual through holes 248A, 248B, 248C and 248D are all given an effective area, therefore, the processing solutions to flow through the individual through holes 248A, 248B, 248C and 248D into the tank body 32 can be set to have substantially equal flow rates.

By thus constructing the vertical passage in the subtank 246 such that the horizontal sectional area of the passage from the lower through hole 248D to the upper through hole 248A may be gradually reduced, and by combining the individual through holes 248A, 248B, 248C and 248D having the sectional areas gradually reduced from the upper portion to the lower portion, moreover, the flow rates of the processing solution to flow from the individual through holes 248A, 248B, 248C and 248D into the tank body 32 can be more finely controlled to equalize the flow rates.

Eighth Embodiment

Figure 21:
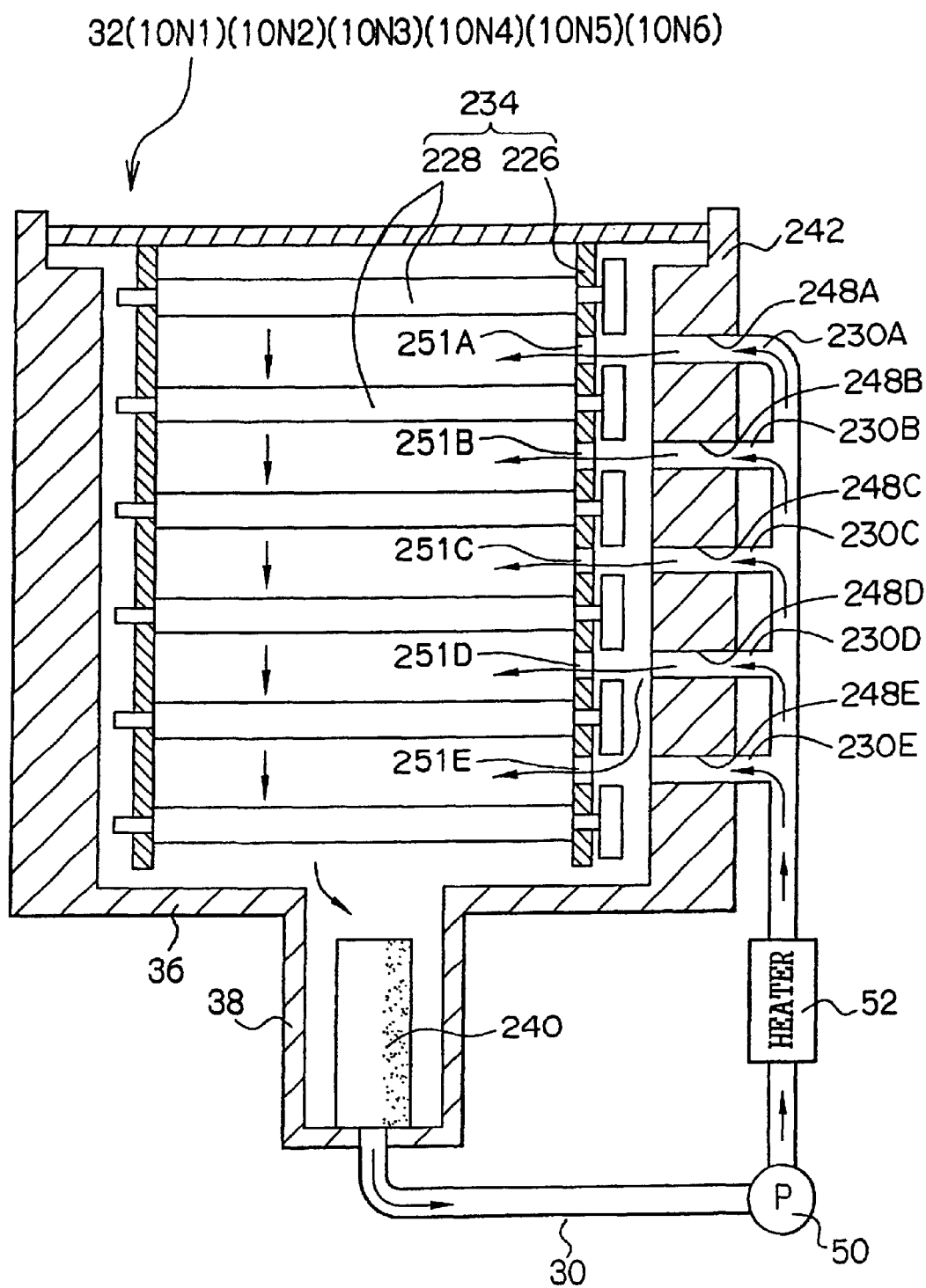
FIG. 21 is a schematic view showing a tank body in a photosensitive material processing apparatus according to an eighth embodiment of the invention.

An eighth embodiment of the invention will now be described with reference to FIG. 21. Components that are substantially the same as components described in previous embodiments are designated by the same reference numerals, and description thereof is omitted.

In this eighth embodiment, the processing solution tank processing solution circulating passage is constructed such that the processing solution is fed to the tank body 32 not through the subtank 246 but is fed directly into the tank body 32 from the circulatory conduit 30.

The circulatory conduit 30 is integrally provided at its end portion with a plurality of (e.g., five in the present embodiment) branch pipes 230A, 230B, 230C, 230D and 230E. In the vertical side wall 242, moreover, a through hole 248E is newly formed below the through hole 248D in addition to the through holes 248A, 248B, 248C and 248D. Moreover, the leading end portions of the individual branch pipes 230A, 230B, 230C, 230D and 230E are integrally connected to the individually corresponding through holes 248A, 248B, 248C, 248D and 248E.

In order that the flow velocities of the processing solutions to be spurted into the tank body 32 from the individual through holes 248A, 248B, 248C, 248D and 248E may be substantially equalized, moreover, the sectional shapes (as circularly or rectangularly opened) and areas of the individual through holes 248A, 248B, 248C, 248D and 248E to be connected are properly set to correspond to the individual branch pipes 230A, 230B, 230C, 230D and 230E, respectively.

Therefore, the processing solution delivered from the circulatory conduit 30 is fed from the individual branch pipes 230A, 230B, 230C, 230D and 230E directly to the individual through holes 248A, 248B, 248C, 248D and 248E. The flow velocities and rates of the processing solution are averaged over the long range in the depth direction from the upper portion to the lower portion in the tank body 32, and the processing solution is distributed to every corners of the tank body 32 so that it is wholly mixed uniformly with the processing solution existing in the tank body 32.

Ninth Embodiment

Figure 22:
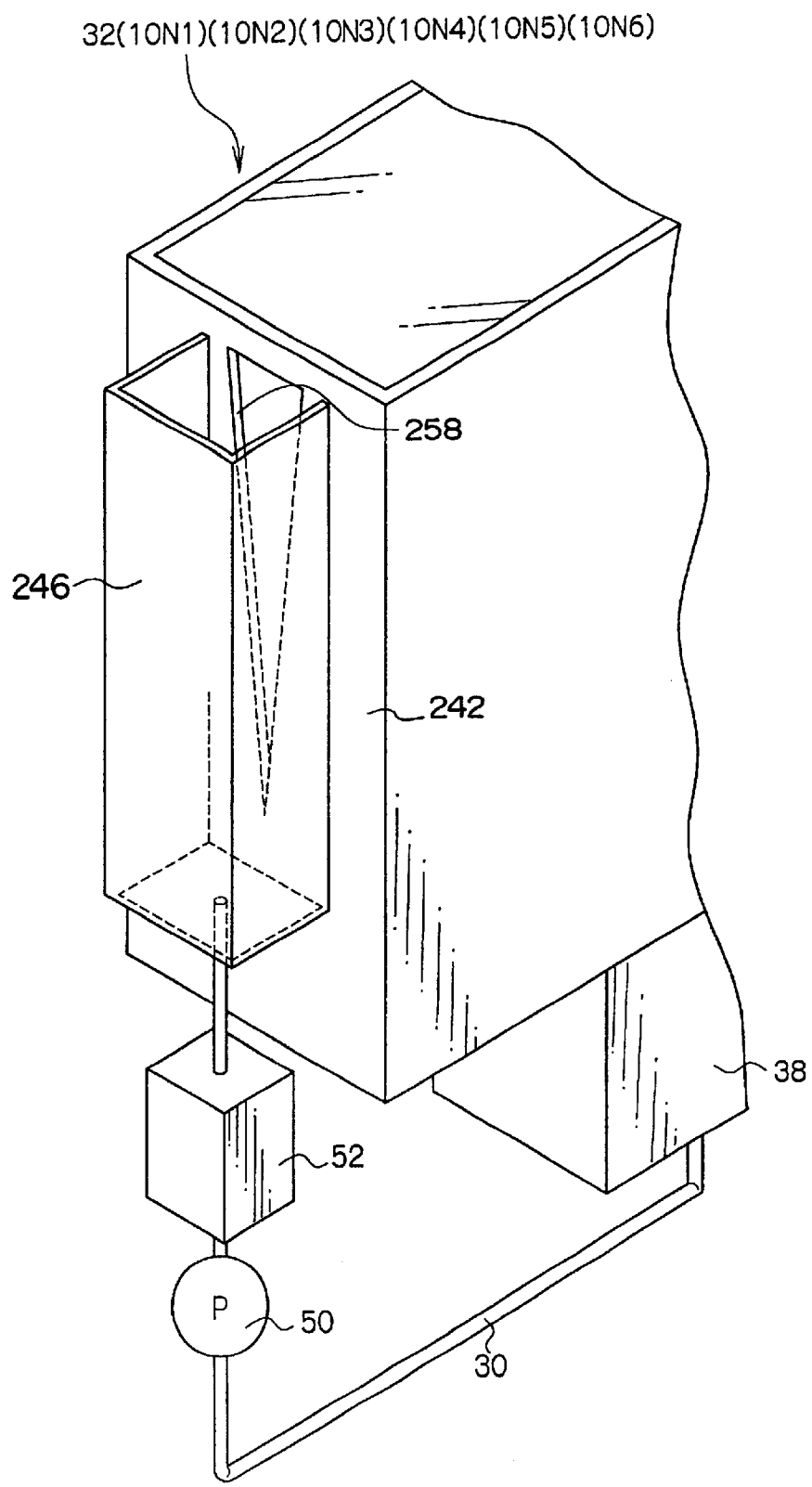
FIG. 22 is a perspective view showing a tank body in a photosensitive material processing apparatus according to a ninth embodiment of the invention.

A ninth embodiment of the invention will now be described with reference to FIG. 22. Components that are substantially the same as components described in previous embodiments are designated by the same reference numerals, and description thereof is omitted.

In order to form a portion of the processing solution tank processing solution circulating passage, according to this ninth embodiment, a slitted through opening, i.e., a flow solution opening 258 formed as a single through opening for adjusting the flow state of the processing solution is formed in the vertical side wall 242 of the tank body 32, namely, in the partition between the tank body 32 and the subtank 246.

The flow solution opening 258 is formed into such an inverted triangular through opening as is narrowed downward in the vertical direction in the portion of the vertical side wall 242 to be dipped in the processing solution.

By forming the flow solution opening 258 as the single through opening into the inverted triangular shape, the processing solution, as fed into the subtank 246, purified and heated/temperature-adjusted, flows through the flow solution opening 258 for adjusting the flow state and flows evenly at a substantially equal flow speed over the long range in the depth direction from the upper portion to the lower portion in the tank body 32. The processing solution is distributed to every corners of the tank body 32 so that it can be wholly mixed uniformly with the processing solution existing in the tank body 32.

For these actions, the flow solution opening 258 for adjusting the flow state is properly set to a front shape (e.g., an inverted triangular shape having two opposed oblique lines curved or a deformed elliptical shape) and a sectional area.

Tenth Embodiment

A tenth embodiment of the invention will now be described. Components that are substantially the same as components described in previous embodiments are designated by the same reference numerals, and description thereof is omitted.

Figure 23:
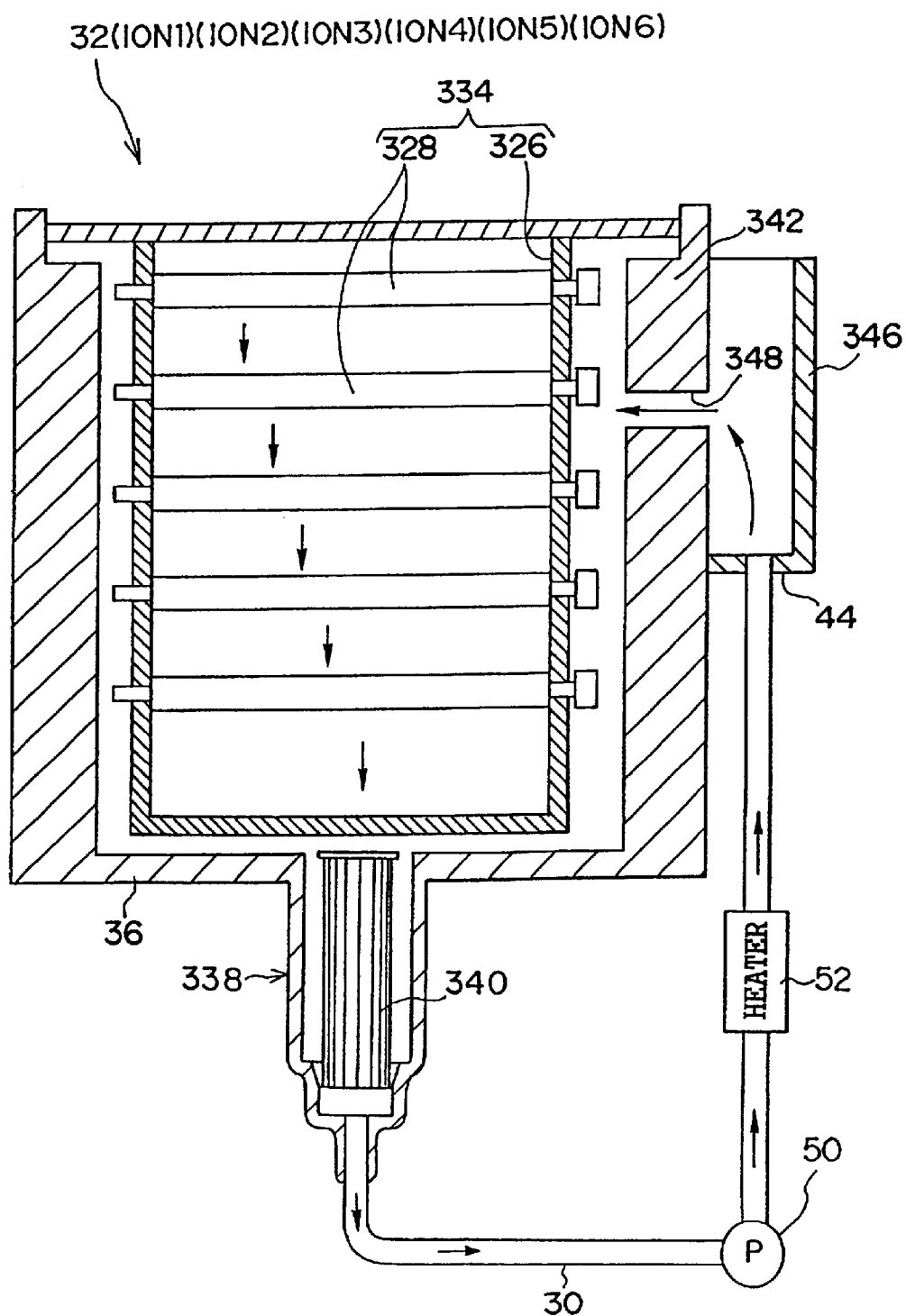
FIG. 23 is a schematic view showing a tank body in a photosensitive material processing apparatus according to a tenth embodiment of the invention.
Figure 24:
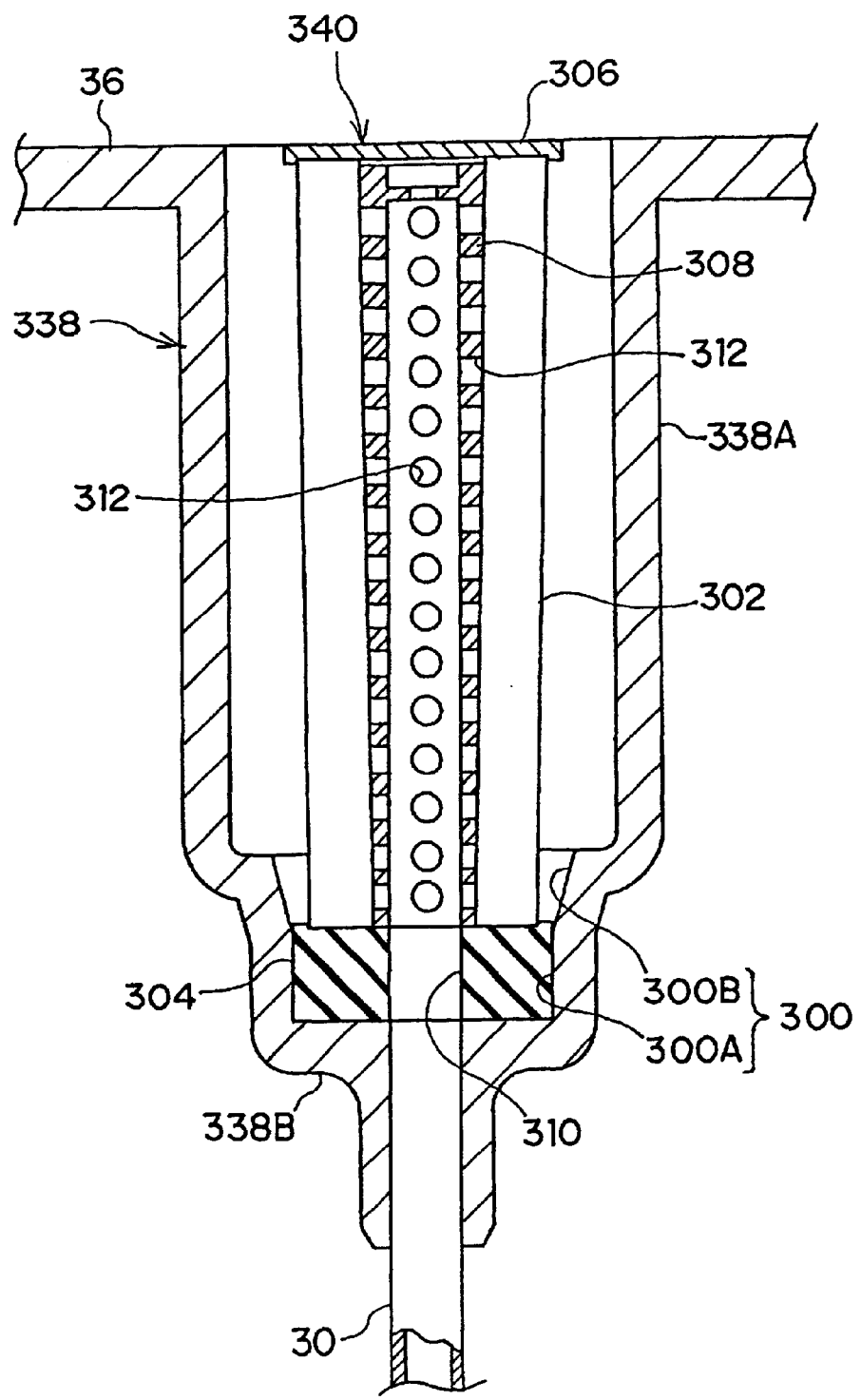
FIG. 24 is a sectional view of an auxiliary chamber having a filter mounted in the photosensitive material processing apparatus according to the tenth embodiment of the invention.

In the tank body 32, as shown in FIGS. 23 and 24, there is integrally formed a recessed auxiliary chamber 338 which is located at the central portion of the bottom surface 36.

This auxiliary chamber 338 is provided with a cylindrical portion 338A and a bottom portion 338B for blocking the lower end of the cylindrical portion 338A. The circulatory conduit 30 is opened and connected at its one end portion to the center of the bottom portion 338B.

The cylindrical portion 338A provides a fitting portion 300 for a later-described filter 340 at a portion on its bottom portion side.

The fitting portion 300 is provided with: a press-fit portion 300A formed on the bottom portion side and having a fixed diameter smaller than the internal diameter of the cylindrical portion 338A; and a tapered insert guide portion 300B formed over the press-fit portion 300A and gradually diverged upward.

Structure of Filter 340

Here will be described the structure of the filter 340 to be fitted in the fitting portion 300.

Figure 26:
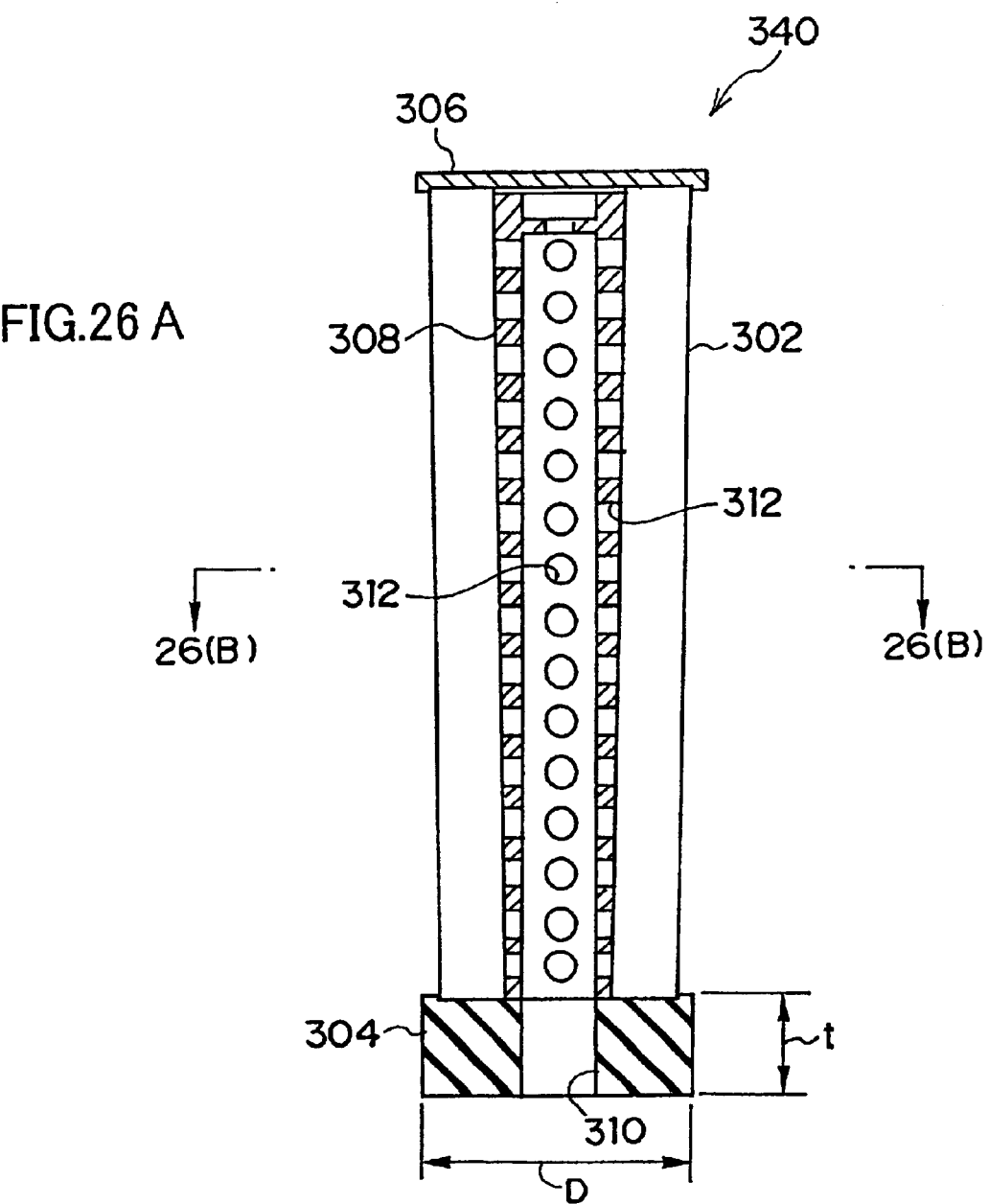
FIG. 26A is a sectional view of the filter.
FIG. 26B is a sectional diagram of the filter shown in FIG. 26A, as taken along line 26B—26B.
Figure 26:
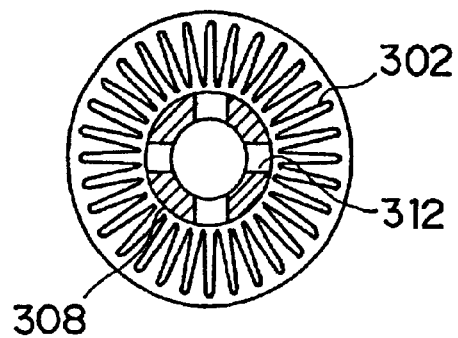

As shown in FIGS. 26A and 26B, the filter 340 is constructed to include: a pleated cylindrical filter member 302 formed by pleating a filtering sheet; a first end cap 304 for blocking one end portion of the pleated filter member 302; a second end cap 306 for blocking the other end portion of the pleated filter member 302; and an inner cylinder 308 arranged in the pleated filter member 302.

The filtering sheet to be used in the pleated filter member 302 is exemplified in this embodiment by a nonwoven fabric but may also be exemplified by a filter material other than the nonwoven fabric.

Here, it it experimentally confirmed, as has been described hereinbefore, that the maximum diameter of the dust particles that can leave no damage on the color paper 16P is 30 microns, even if the dust particles are included in the individual processing solutions when the color paper 16P is to be treated in the printer processor 10.

It is, therefore, desired that the filtering sheet has a mesh size of 30 microns or less.

In the pleated filter member 302 of the present embodiment, the filtering sheet has a mesh size of 30 microns and a filtration area of 600 $cm^2$.

Moreover, the first end cap 304 and the second end cap 306 are fixed on the individual end portions of the pleated filter member 302 by means of an adhesive.

Here, the first end cap 304 is formed of an elastic member into a disc shape having a constant external diameter D, and has a communication hole 310 at its central portion.

The elastic member can be exemplified by rubber or a synthetic resin.

The elastic member has a hardness (as measured in conformity with JIS K6310 A) of a range of 30 to 100 degrees or preferably 40 to 60 degrees.

Moreover, the elastic member may be a foamed soft resin (e.g., sponge having numerous independent foams) having an impermeability to solutions. This foamed resin is exemplified by foamed polypropylene.

Figure 25:
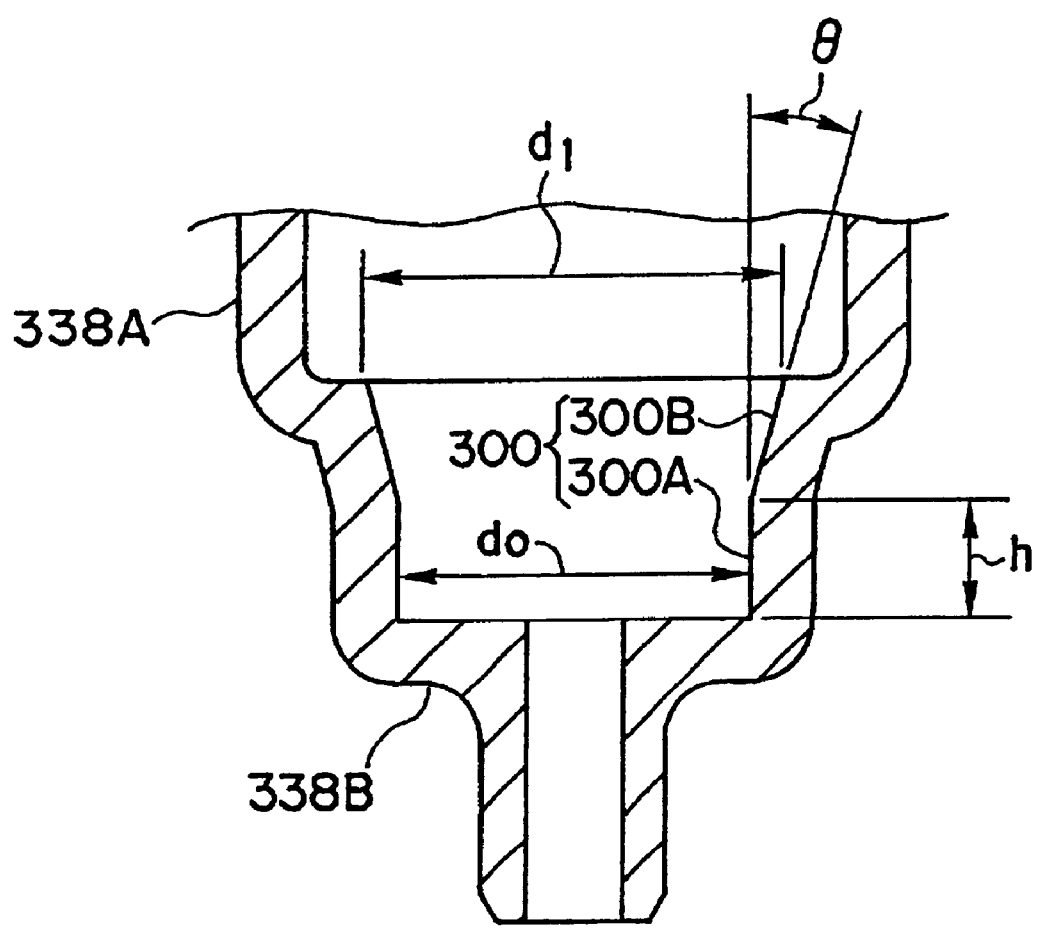
FIG. 25 is a sectional view of a lower portion of the auxiliary chamber in the photosensitive material processing apparatus according to the tenth embodiment of the invention.

As shown in FIG. 25, the press-fit portion 300A of the fitting portion 300 is set to have such an internal diameter $d_0$ slightly smaller than the external diameter D of the first end cap 304 that the first end cap 304 is compressed, when press-fitted, in the press-fit portion 300A to have its outer circumference closely fitted in the inner circumference of the press-fit portion 300A, as shown in FIG. 24.

As shown in FIG. 25 and FIGS. 26A and 26B, the internal diameter $d_1$ of the open end of the insert guide portion 300B of the fitting portion 300 is preferably set larger by 0.5 to 3.0% than the external diameter D of the first end cap 304 of the filter 340, and more preferably set larger by 1.0 to 2.0%.

The thickness t of the first end cap 304 is preferably within a range of 1 to 5 mm.

The depth h of the press-fit portion 300A is preferably larger than the thickness t of the first end cap 304 and within a range of 2 to 30 mm.

The cone angle θ of the insert guide portion 300B is set preferably within a range of 0.5 to 45 degrees.

As shown in FIGS. 26A and 26B, the inner cylinder 308 of the filter 340 is fixed at its one end in the first end cap 304 by means of an adhesive so that the communication hole 310 of the first end cap 304 communicates with the internal space of the inner cylinder 308.

In the outer surface of the inner cylinder 308, there are formed a plurality of through holes 312, through which the internal space of the inner cylinder 308 communicates with the outside of the inner cylinder 308.

When the first end cap 304 of the filter 340 is press-fitted and fixed in the press-fit portion 300A of the auxiliary chamber 338, as shown in FIG. 24, the circulatory conduit 30 communicates with the inside of the processing solution tank through the filter 340.

On the tank body 32, moreover, there is integrally mounted a subtank 346 which is located in the upper portion of the vertical side wall 342. In this vertical side wall 342 at a position located vertically downward by a predetermined distance from the solution surface of the processing solution contained in the tank body 32, there is formed the through hole 348 which extends from the subtank 346 into the tank body 32, so that the processing solution charged in the subtank 346 can flow out into the tank body 32 (as referred to FIG. 23).

As in the foregoing other embodiments, the subtank 346 is opened in its bottom 44 and is integrally connected to the opening of the other end portion of the circulatory conduit 30.

This circulatory conduit 30 is constructed as a series conduit which leads from one end portion on the side of the opening opened in the bottom portion of the auxiliary chamber 338 to the other end portion on the side of the opening opened in the bottom center of the subtank 346.

Midway of this circulatory conduit 30, there are arranged the pump 50 and the heater 52 as the temperature adjusting device sequentially in the recited order from one end portion of the side of the opening opened in the bottom portion of the auxiliary chamber 338.

Action

Here will be described the action of the printer processor 10 of the present embodiment.

First of all, the color paper 16P, as pulled out from the magazine 16, is printed at the exposure unit 14 with the image of the negative film N and is conveyed into the processing section 10N.

The color paper 16P becomes a color print after it was developed at the color developing tank 10N1, fixed at the bleaching-fixing tank 10N2, rinsed with water at the rinsing tanks 10N3 to 10N6 and dried at the drying unit 10N7.

This color print is stocked in the sorter 10N8.

In each processing solution tank 10N1 (10N2, 10N3, 10N4, 10N5 or 10N6), the processing solution in the lower portion of the tank body 32 is fed into the auxiliary chamber 338 by driving the pump 50, and the dust particles are adsorbed by the filter 340 in the auxiliary chamber 338 to purify the processing solution by sucking it into the circulatory conduit 30 through the filter 340.

The processing solution, as sucked to flow in the circulatory conduit 30 at a circulation flow rate of 1 to 7 liters/min. by the action of the pump 50, is heated to a predetermined temperature by the heater 52. After this, the processing solution is discharged from the opening at the center of the bottom 44 into the subtank 346 and flows through a through hole 348 into the upper region of the tank body 32 and then downward into the lower region in the tank body 32. These circulating actions are repeated.

Specifically, in the processing solution circulating and purifying system in each processing solution tank 10N1 (10N2, 10N3, 10N4, 10N5 or 10N6), the subtank 346 is fed with the processing solution which has been pressurized by the pump 50 and temperature-adjusted by the heater 52. Then, the processing solution in the subtank 346 flows out through the through hole 348 into the upper region of the tank body 32.

Then, the processing solution having been fed to the upper region of the tank body 32 flows downward from the upper region to the lower region in the tank body 32. Moreover, the processing solution of the lower region flows into the auxiliary chamber 338 and is cleared of the dust particles by the filter 340, as it is sucked through the filter 340 into the circulatory conduit 30, so that it is purified.

The pleated filter member 302 used in the filter 340 is formed into the cylindrical shape by pleating the nonwoven fabric and can have a large filtration area, although small-sized, to have a low resistance to the passage of the processing solution. Therefore, the filter member 302 can have a long lifetime and can prevent the cavitation.

Even if the filter 340 is disposed on the bottom of the tank body 32 so that it is troublesome for its replacing or cleaning operations, therefore, the frequencies of replacing or cleaning operations can be decreased to reduce the troubles for maintaining the printer processor 10 and to improve the operationing efficiency for a long time.

In the circulating and purifying system of the processing solution in each processing solution tank 10N1 (10N2, 10N3, 10N4, 10N5 or 10N6), moreover, the processing solution is fed downward (as the downflow) from the upper region to the lower region, and the dust particles are trapped by the filter 340 arranged on the bottom portion side in the tank body 32.

As a result, the dust particles exceeding 30 microns, which might otherwise float in the processing solution in each processing solution tank 10N1 (10N2, 10N3, 10N4, 10N5 or 10N6) and damage the color paper 16P easily, are carried on the flow of the processing solution downward (as the downflow) from the upper region to the lower region, and settle on the bottom portion side by their own weights.

Moreover, the dust particles having settled on the bottom portion side of each processing solution tank 10N1 (10N2, 10N3, 10N4, 10N5 or 10N6) flow and gather in the auxiliary chamber 338 so that they are trapped by the filter 340. As a result, the processing solution can be sufficiently cleared of the dust particles exceeding 30 microns, which might otherwise damage the color paper 16P easily.

Moreover, the dust particles exceeding 30 microns, as might otherwise damage the color paper 16P easily, are trapped by the filter 340 so that they do not easily float. At the time of circulating the predetermined processing solution in the tank body 32 or at the time of mounting and removing the processing rack 334, therefore, the floating of the dust particles exceeding 30 microns, as might otherwise damage the color paper 16P easily, in the predetermined processing solution is suppressed to cause no damage on the surface of the color paper 16P. Thus, it is possible to keep the stable processing performance to form an image having no damage on the color paper 16P.

When the filter 340 is mounted in the auxiliary chamber 338, moreover, the first end cap 304 made of an elastic member is compressed, when merely pushed into the fitting portion 300, by the press-fit portion 300A so that its outer circumference is closely fitted in the inner circumference of the press-fit portion 300A. Therefore, the filter 340 can be reliably mounted with the simple structure by suppressing the number of parts to minimum while making it unnecessary to provide a seal member such as an O-ring or a packing separately.

Figure 27:
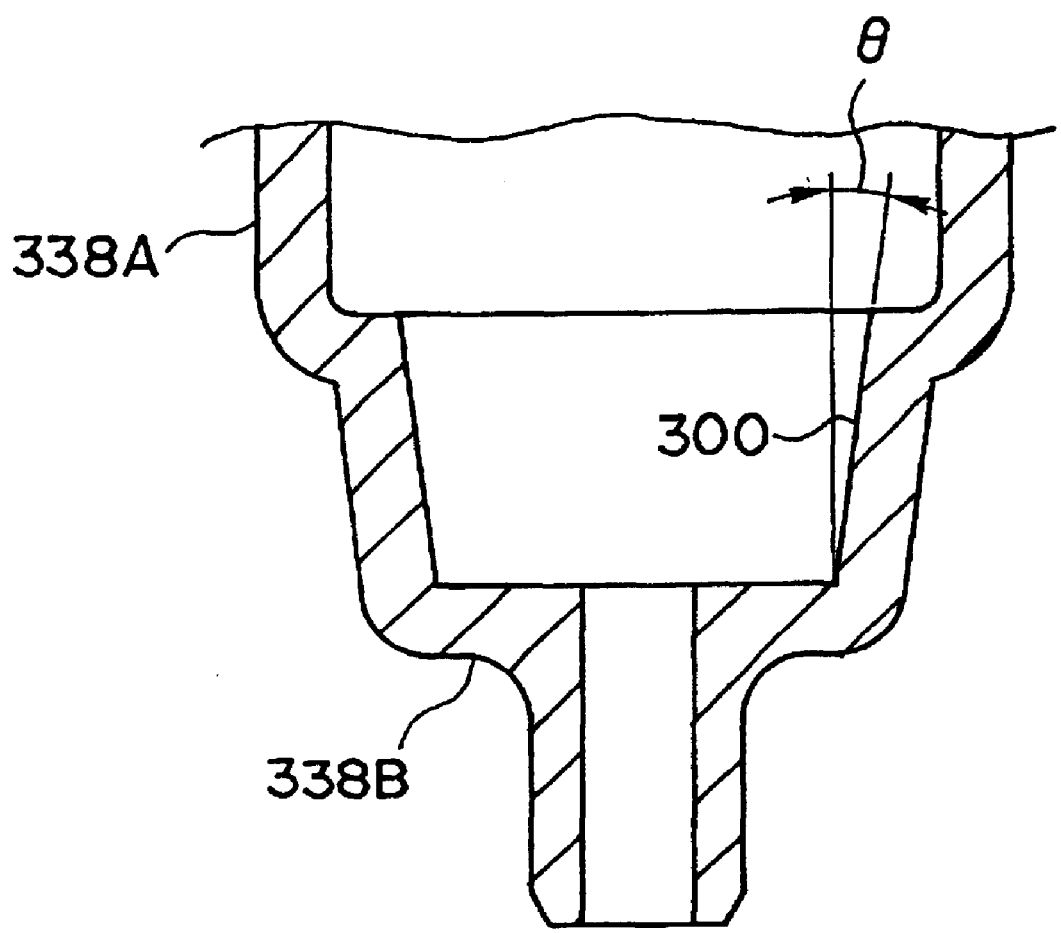
FIG. 27 is a sectional view of a lower portion of the auxiliary chamber in the photosensitive material processing apparatus according to the tenth embodiment of the invention.

Here, the fitting portion 300 of the present embodiment is provided with the press-fit portion 300A of a constant diameter and the tapered insert guide portion 300B, but may also be formed into a tapered shape, as shown in FIG. 27.

Eleventh Embodiment

Figure 28:
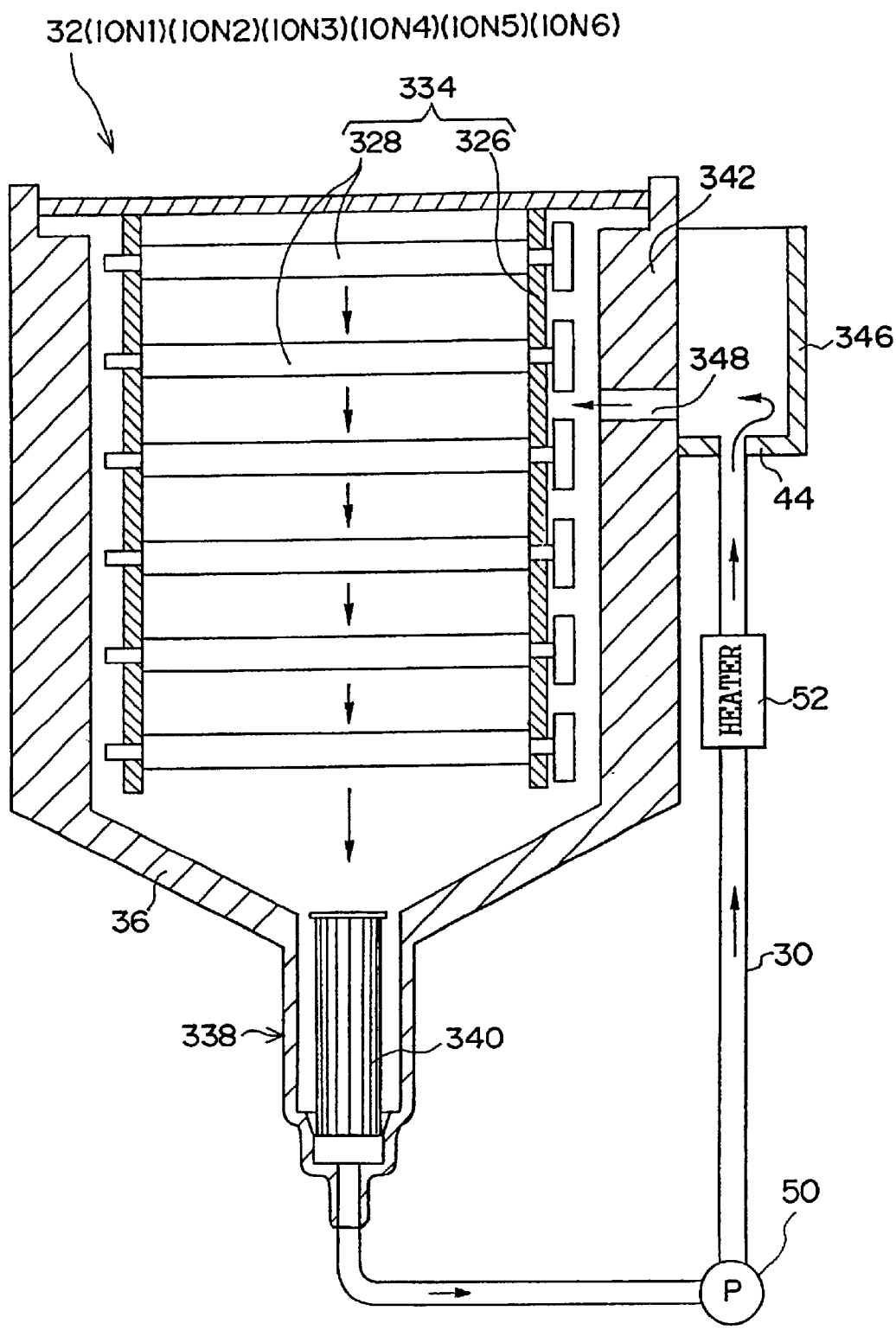
FIG. 28 is a schematic view showing a tank body in a photosensitive material processing apparatus according to an eleventh embodiment of the invention.

An eleventh embodiment of the invention will now be described with reference to FIG. 28. Components that are substantially the same as components described in previous embodiments are designated by the same reference numerals, and description thereof is omitted.

In this eleventh embodiment, the bottom portion of the tank body 32 is formed into such a structure as can accumulate the dust particles.

For this, the bottom surface 36 of the tank body 32 is conically recessed toward the circumference of the auxiliary chamber 338 at its central portion.

By thus forming the bottom surface 36 into the conically recessed shape, the dust particles having a size exceeding 30 microns, which have been carried on the flow of the processing solution in each processing solution tank 10N1 (10N2, 10N3, 10N4, 10N5 or 10N6) and have settled by their own weights and which might otherwise damage the color paper 16P, move along the conically recessed slope of the bottom surface 36 and accumulate in the auxiliary chamber 338.

Therefore, the sedimentation and residual of the dust particles on the bottom surface 36 are suppressed so that the dust particles can be efficiently accumulated in the auxiliary chamber 338 and trapped by the filter 340.

Twelfth Embodiment

A twelfth embodiment of the invention will now be described with reference to FIGS. 29 and 30. Components that are substantially the same as components described in previous embodiments are designated by the same reference numerals, and description thereof is omitted.

The present embodiment is constructed such that the auxiliary chamber 338 is disposed in the bottom surface of the tank body 32 for the color paper 16P in the horizontal multiple-chamber processors partitioned by a blade, and such that the filter 340 is arranged in the auxiliary chamber 338.

Figure 29:
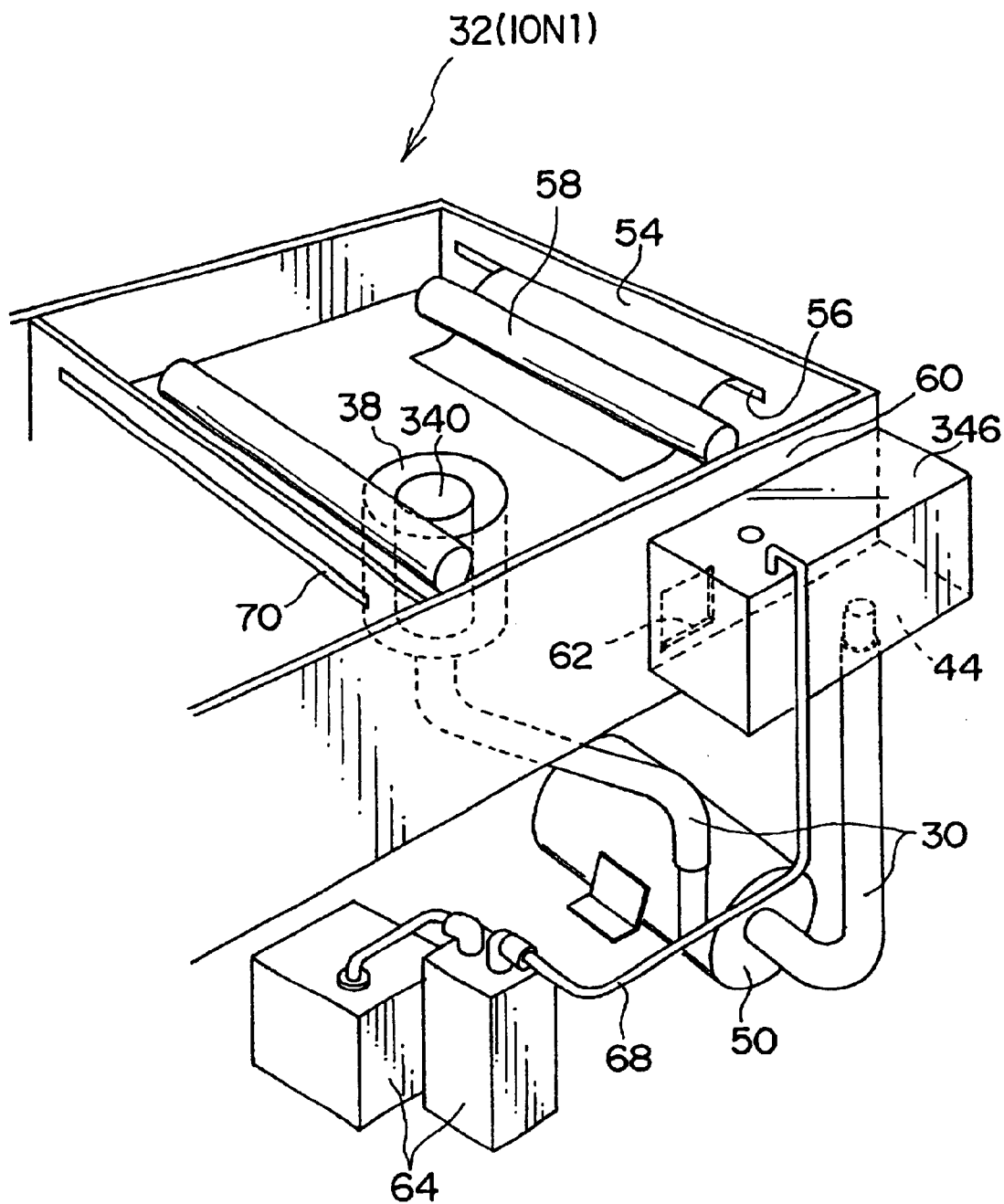
FIG. 29 is a schematic perspective view showing a tank body in a photosensitive material processing apparatus according to a twelfth embodiment of the invention.

The tank body 32 shown in FIG. 29 is constructed as the color developing tank, in which the slit 56 for inserting the color paper 16P thereinto is formed in the wall 54 on the upstream side (or the exposure unit side) of the conveyance direction of the color paper 16P.

In order to suck the processing solution, moreover, there is disposed on the bottom portion of the tank body 32 the auxiliary chamber 338 which is opened in its bottom surface to form the opening of circulatory conduit 30, and the filter 340 is arranged over the opening. Across the auxiliary chamber 338 on the upstream side and on the downstream side of the conveyance direction of the color paper 16P, there are disposed conveyance rollers 58 which individually clamp and convey the color paper 16P.

As shown in FIG. 29, moreover, the subtank 346 is disposed at one side portion of the tank body 32.

In the partition 60 between the tank body 32 and the subtank 346, there is formed the opening 62 to allow the processing solution or the color developing solution to flow back and forth between the tank body 32 and the subtank 346.

Moreover, the circulatory conduit 30, as led out from the discharge side of the pump 50, is connected to open the opening in the bottom 44 of the subtank 346.

In the circulatory conduit 30, moreover, by driving the pump 50, the processing solution or the color developing solution in the lower region of the tank body 32 is sucked from the auxiliary chamber 338 while being purified through the filter 340, and is pressurized and fed out into the subtank 346 by the pump 50. The processing solution is fed from the subtank 346 through the opening 62 to the upper region of the processing solution contained in the tank body 32.

By flowing the processing solution contained in the tank body 32 from the upper region to the lower region, the processing solution is circulated and purified while the dust particles exceeding 30 microns to damage the color paper 16P easily are being trapped by the filter 340.

Moreover, the subtank 346 can be supplied from the conduit 68 with the color developing solution contained in the processing solution tank 64.

In the partition of the tank body 32 on the downstream side of the conveyance direction, moreover, there is formed the slit 70 for passing the color paper 16P therethrough.

This partition is provided at its portion of the slit 70 with (not-shown) the thin blade which is made of an elastomer of rubber or the like (e.g., rubber such as silicone rubber, fluorine rubber, polyurethane rubber or ethylene-propylene rubber but also by an elastomer or soft resin having excellent durability and chemical resistance).

This blade slides and clamps the surface or back of the color paper 16P elastically, when this color paper 16P is conveyed to pass through the slit 70, to prevent the processing solution in the tank body 32 from flowing into the subsequent tank body 32.

Moreover, the dust particles exceeding 30 microns, as might otherwise damage the color paper 16P easily, are trapped by the filter 340 to purify the processing solution by circulating the processing solution, as contained in the tank body 32 shown in FIG. 29, from the upper region to the lower region. Therefore, the damage of the surface of the color paper 16P can be suppressed, as might otherwise be caused when the dust particles adhere to the surface and are scrubbed by the blade.

Figure 30:
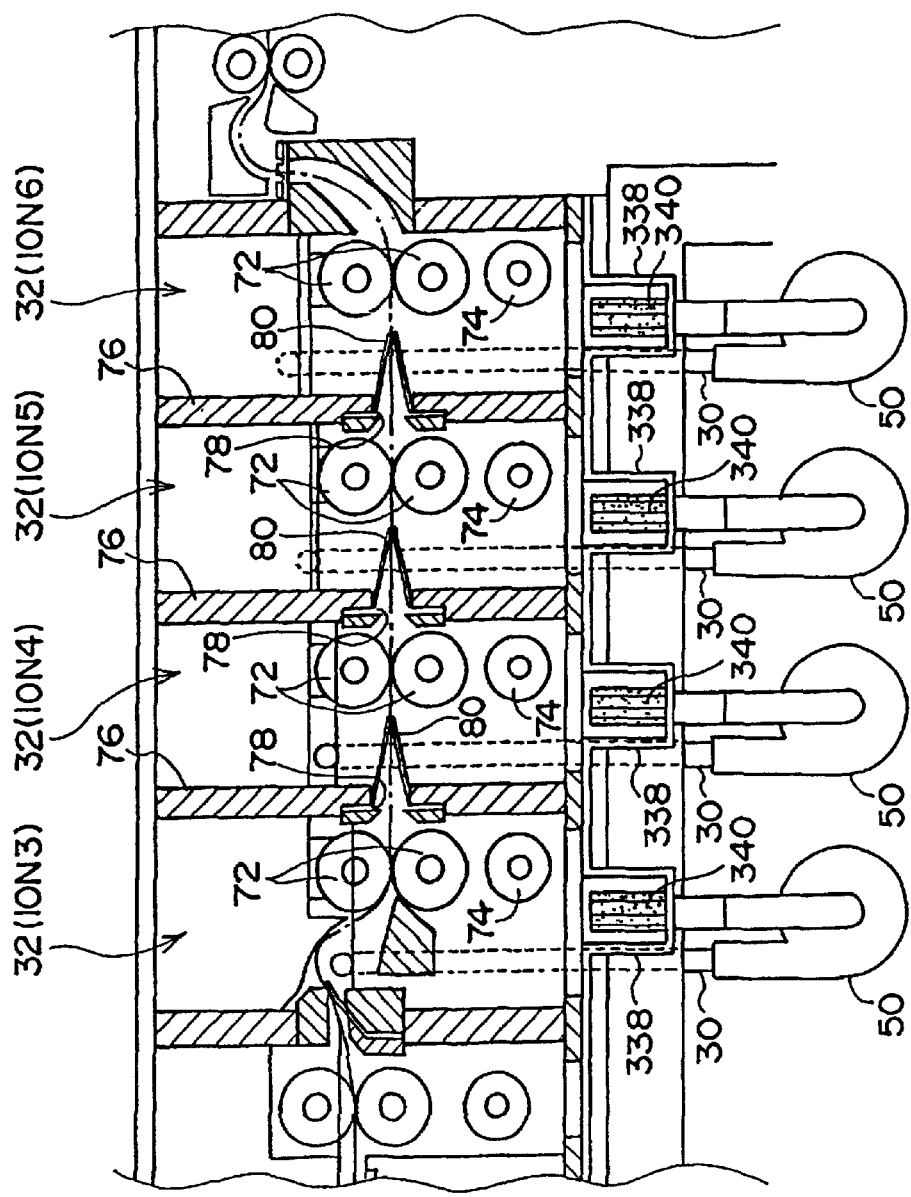
FIG. 30 is a schematic view showing the tank body in the photosensitive material processing apparatus according to the twelfth embodiment of the invention.

Here will be described the case in which the individual processing solution tanks 32 shown in FIG. 30 are constructed as the rinsing tanks 10N3 to 10N6.

As shown in FIG. 30, each of the rinsing tanks 10N3 to 10N6 is provided with the conveyance rollers 72 for clamping and conveying the color paper 16P horizontally, and the stirring rollers 74.

Each partition 76 between those individual rinsing tanks 10N3 to 10N6 is provided with the slit 78 for allowing each color paper 16P to pass therethrough.

Each partition 76 is provided at each slit 78 with the blade 80 which is made of an elastomer of rubber or the like (e.g., rubber such as silicone rubber, fluorine rubber, polyurethane rubber or ethylene-propylene rubber but also by an elastomer or soft resin having excellent durability and chemical resistance). The blade 80 is equipped with elongated rectangular flange portions for attaching it to the partition 76.

The blade 80 is constructed by protruding the blade body portion integrally from the center of the flange portion downstream of the paper conveyance direction. This blade body portion is equipped with an upper lip and a lower lip, which come closer to each other as they protrude more downstream from the vertical upper and lower end portions of the open portion. In the present embodiment, the blade 80 is provided with upper and lower lips. However, there may be only one lip provided, as long as the lip is provided on the side which corresponds to the emulsion side of the color paper 16P.

These upper and lower lips closely contact with each other near their leading ends.

Moreover, the upper lip and the lower lip are enabled, when elastically deformed, to bring their leading ends apart from each other.

This blade 80 slides on the color paper 16P by clamping the surface and back of the color paper 16P elastically when the color paper 16P is conveyed through the slit 70, thereby to prevent the processing solution in the tank body 32 from flow out into the subsequent tank body 32.

On the bottom portion of each of the rinsing tanks 10N3 to 10N6 as each tank body 32, moreover, there is mounted the auxiliary chamber 338 for sucking the processing solution. The opening of the circulatory conduit 30 is opened at the bottom surface of each auxiliary chamber 338, and the filter 340 is arranged to cover the opening.

Each circulatory conduit 30 is constructed to suck the processing solution of the lower region in the tank body 32 on the upstream side from the auxiliary chamber 338 through the filter 340 and to discharge the sucked processing solution to the upper region of the tank body 32.

Here, the tank body 32 or the rinsing tank 10N3 on the most upstream side is supplied, if necessary, with a fresh processing solution (or rinsing water), although not shown. Moreover, the processing solution flows sequentially from the rinsing tank 10N3 on the most upstream side to the rinsing tank 10N6 on the most downstream side. Moreover, the excess processing solution is suitably discharged from the tank body 32 or the rinsing tank 10N6 on the most downstream side.

Thus in the individual processing solution tank bodies 32 corresponding to the rinsing tanks 10N3 to 10N6 shown in FIG. 30, the dust particles exceeding 30 microns, as might otherwise damage the color paper 16P easily, are trapped and cleared with the filter 340 by causing the processing solution contained in the tank bodies to flow from the upper region to the lower region.

Therefore, it is possible to solve the following problems: that the relatively large dust particles, as floated by the water flow to circulate the processing solution or when the rack is removed, adhere to the blade 80 to damage the surface of the color paper 16P; and that the dust particles, as floated in the processing solution when the color paper 16P is treated with its emulsion surface being downward, adhere to the emulsion surface so that the color paper 16P having the dust particles on its surface is scrubbed and damaged by the blade 80 when it passes through the blade 80.

Thirteenth Embodiment

Figure 31:
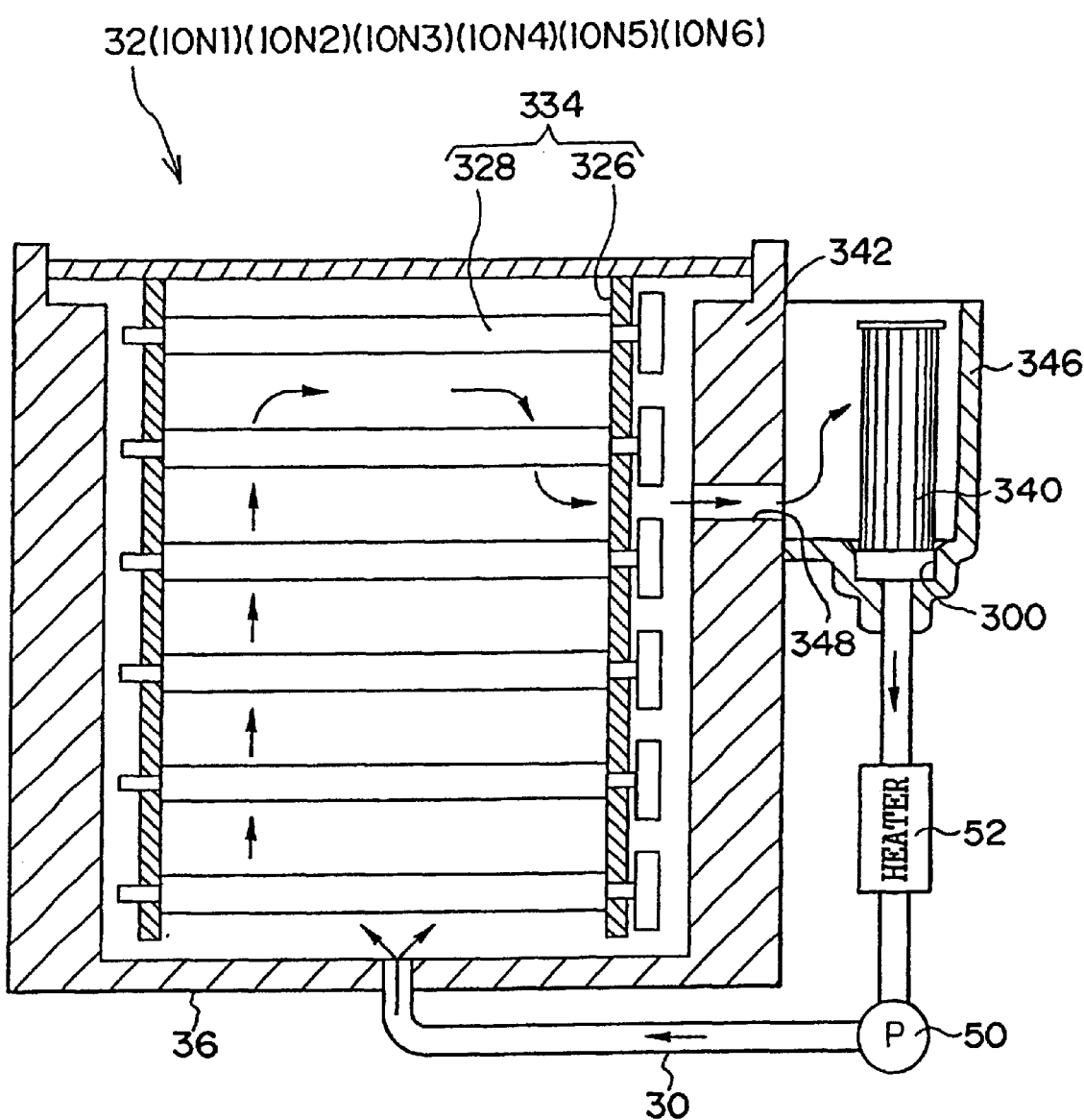
FIG. 31 is a schematic view showing a tank body in a photosensitive material processing apparatus according to a thirteenth embodiment of the invention.

A thirteenth embodiment of the invention will now be described with reference to FIG. 31. Components that are substantially the same as components described in previous embodiments are designated by the same reference numerals, and description thereof is omitted.

In the present embodiment, the subtank 346 is used as the auxiliary chamber. The subtank 346 is provided at its bottom portion with the fitting portion 300, in which the filter 340 is mounted.

In the present embodiment, the processing solution in the subtank 346 is filtered by the filter 340, and the filtered processing solution is returned from the bottom portion of the processing solution tank to the inside of the processing solution tank.

Fourteenth Embodiment

Figure 32:
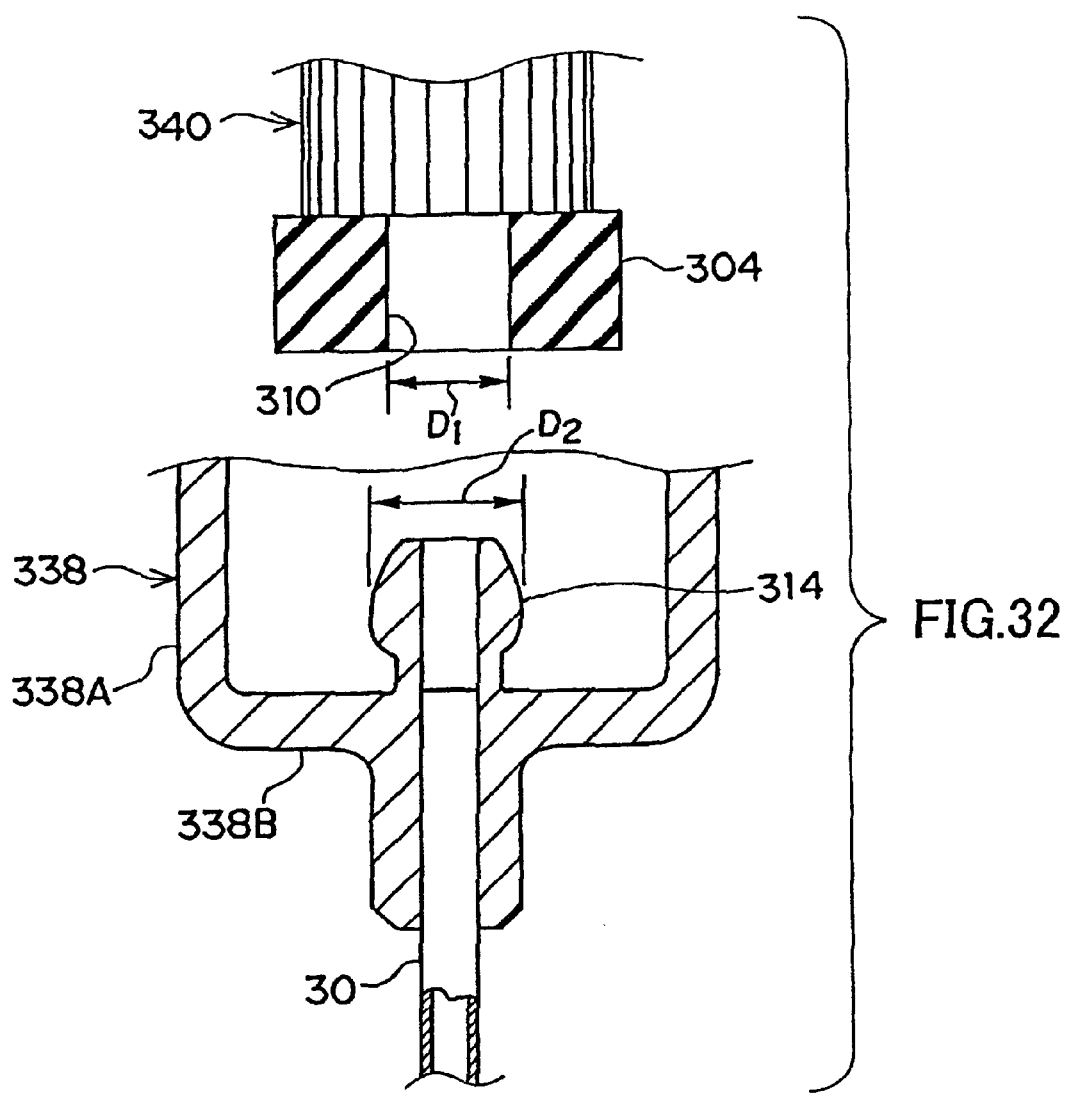
FIG. 32 is a sectional view of an auxiliary chamber and a filter in the photosensitive material processing apparatus according to the thirteenth embodiment of the invention.
Figure 33:
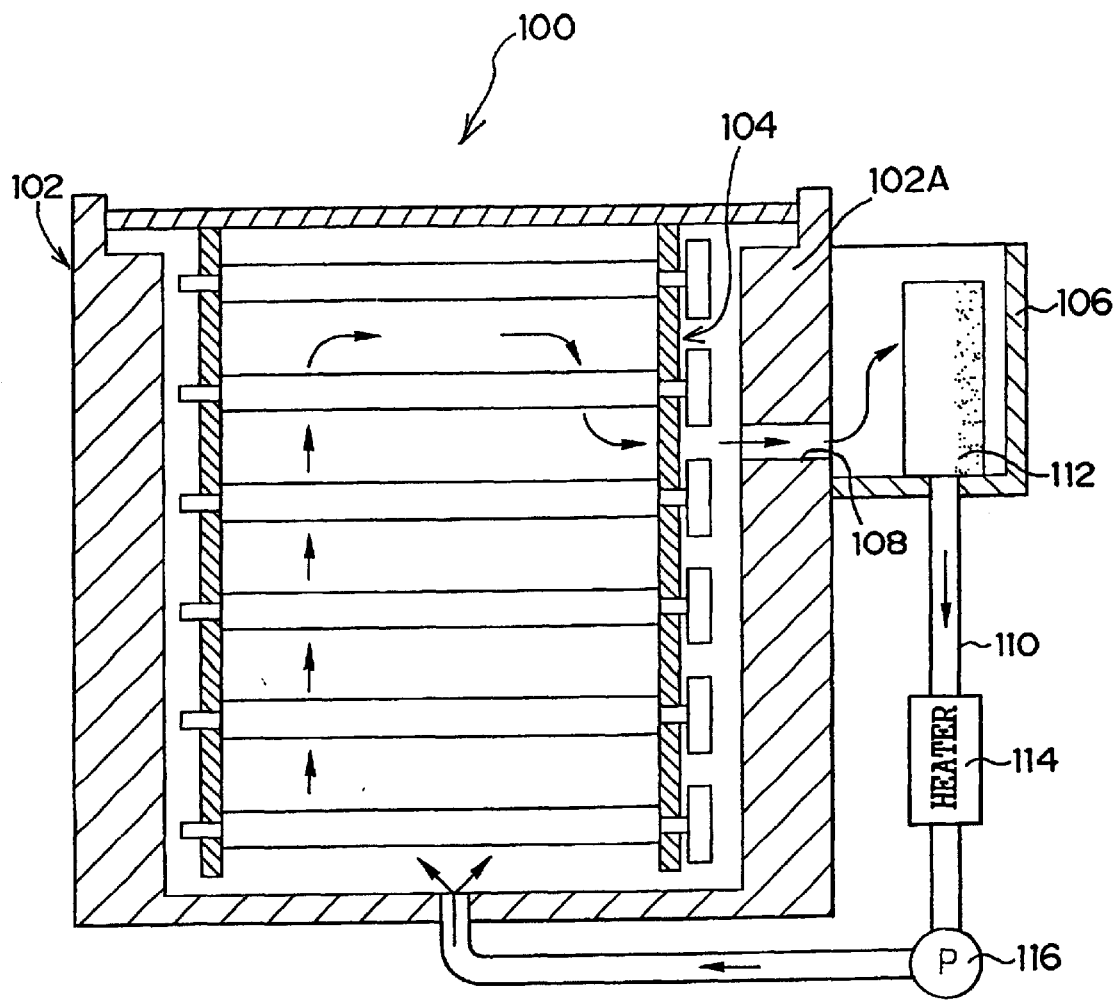
FIG. 33 is a schematic view showing a tank body in a photosensitive material processing apparatus of the prior art.

A fourteenth embodiment of the invention will now be described with reference to FIG. 32. Components that are substantially the same as components described in previous embodiments are designated by the same reference numerals, and description thereof is omitted.

The auxiliary chamber 338 of the present embodiment is provided at its bottom portion 338B with a bayonet portion 314 which has a thinned root portion and a generally spherical upper portion.

Here, the bayonet portion 314 communicates with the circulatory conduit 30.

The communication hole 310 of the first end cap 304 of the filter 340 has a diameter $D_1$ set slightly smaller than the maximum diameter $D_2$ of the bayonet portion 314.

By press-fitting the bayonet portion 314 into the communication hole 310 of the filter 340, therefore, the filter 340 can be fixed.

As has been described hereinbefore, the photosensitive material processing apparatus of the invention is constructed such that the filter is arranged to purify the processing solution contained in the tank body, when the processing solution is sucked by the circulatory conduit from the lower region of the processing solution contained in the tank body and flows out into the upper region of the processing solution contained in the tank body. Therefore, the dust particles, as might otherwise float in the processing solution in the tank body to damage the photosensitive material easily, are carried downward to the bottom portion side on the downward flow of the processing solution from the upper region to the lower region so that they may settle onto the bottom portion side by their own weights. As a result, the processing solution can be sufficiently cleared of the dust particles to damage the dust particles easily. Moreover, the dust particles to damage the photosensitive material easily are trapped by the filter to suppress the cause for the dust particles in the processing solution in the tank body to damage the surface of the photosensitive material so that the stable processing performance can be kept to form the image having no damage in the photosensitive material.

In the photosensitive material processing apparatus of the invention, moreover, the filter is arranged to cover the opening which is opened in the recessed auxiliary chamber 44 formed integrally with the bottom surface of the tank body, with such a distance D between the outer circumference of the filter and the inner circumference of the auxiliary chamber as is expressed by Relation A: "$D>0.23X+2.5$", and the processing solution having been purified through the filter from the lower region of the processing solution contained in the tank body is discharged by the circulatory conduit to the upper region of the processing solution contained in the tank body. As a result, the processing solution contained in the tank body flows from the upper region to the lower region, and the dust particles in the processing solution may be carried on the flow of the processing solution and may settle by their own weights so that the dust particles can be trapped by the filter. Moreover, the filter arranged in the auxiliary chamber is arranged such that its outer circumference is spaced from the inner circumference of the auxiliary chamber at the distance D expressed by Relation A: "$D>0.23X+2.5$". Therefore, a sufficient clearance is established for eliminating the resistance to the processing solution between the outer circumference of the filter and the inner circumference of the auxiliary chamber, i.e., the resistance to the processing solution in the tank body, as guided into the auxiliary chamber and flowing into the circulatory conduit through the filter, so that the cavitation can be prevented from occurring in the pump disposed in the circulatory conduit for circulating the processing solution, thereby to prevent the degradation of the processing solution.

In the photosensitive material processing apparatus of the invention, moreover, the filter is so arranged that it can purify the processing solution contained in the tank body. Over a long range of the vertical side wall of the tank body in the depth direction from the upper portion to the lower portion, there is integrally disposed the subtank for reserving the processing solution. A through hole is formed over a predetermined portion from the upper portion to the lower portion of the vertical side wall dipped in the processing solution between the tank body and the subtank. Alternatively, a plurality of through holes are formed to extend through a plurality of positions from the upper portion to the lower portion of the vertical side wall. By the circulatory conduit system, the processing solution is discharged from the lower region of the processing solution contained in the tank body into the subtank so that the processing solution is evenly discharged through the through holes over the long range in the depth direction from the upper region to the lower region of the processing solution contained in the tank body. As a result, the processing solution is mixed uniformly with the processing solution existing in the tank body, and the processing solution contained in the tank body is purified through the filter.

By clearing the processing solution sufficiently of the dust particles which might otherwise damage the photosensitive material, the dust particles such as relatively large particles (of micron order) floating in the processing solution contained in the tank body settle to the bottom of the tank body and are prevented from residing in the floating state. Moreover, the dust particles to damage the photosensitive material are trapped by the filter so that they do not easily float. Therefore, the floating of the dust particles in the processing solution in the tank body to damage the surface of the photosensitive material can be suppressed to keep the stable processing performance to form the image having no damage on the photosensitive material.

According to the photosensitive material processing apparatus and the pleated cartridge filter of the invention, there are acquired the excellent effects that the frequency for the filter replacement can be reduced, and that the sealing can be made reliable without using the known O-ring or packing in the fitting portion.

What is claimed is:

1. A photosensitive material processing apparatus including a tank that has a body charged with a solution that processes the photosensitive material, the apparatus comprising:
    a pleated filter disposed on an inner bottom surface of the tank body; and
    a conduit for circulating the processing solution passing through the pleated filter from a lower region of the tank body to an upper region of the tank body.

2. A photosensitive material processing apparatus including a tank that has a body charged with a solution that processes the photosensitive material, the apparatus comprising:
    an auxiliary chamber formed integrally with a bottom surface of the tank body;
    a filter that covers an opening in the auxiliary chamber; and
    a conduit for drawing processing solution that has passed through and been purified by the filter from a lower region of the tank body and sending the processing solution to an upper region of the tank body, to thereby circulate the processing solution charged in the tank body from the upper region to the lower region.

3. The apparatus of claim 2, wherein the bottom surface of the tank body is conically recessed towards the periphery of the auxiliary chamber.

4. The apparatus of claim 3, wherein the filter is pleated.

5. A photosensitive material processing apparatus including a tank that has a body charged with a solution that processes the photosensitive material, the apparatus comprising:
    a plate-shaped filter that covers an entire bottom surface of the tank body and is spaced apart from the bottom surface; and
    a conduit for drawing the processing solution from an opening in the bottom surface of the tank body up through the filter to purify the processing solution and for sending the processing solution to an upper region of the tank body, to thereby circulate the processing solution charged in the tank body from the upper region to a lower region.

6. A photosensitive material processing apparatus including a pump and a tank that has a body charged with a solution that processes the photosensitive material, the apparatus comprising:
    an auxiliary chamber formed integrally with a bottom surface of the tank body;
    a filter that covers an opening in the auxiliary chamber and is disposed such that an outer peripheral surface of the filter is positioned at a distance D in mm from an inner peripheral surface of the auxiliary chamber, with D being greater than 0.23X+2.5, X representing actual flow rate in liters/minute of the pump; and
    a conduit for drawing the processing solution that has passed through and been purified by the filter from a lower region of the tank body and sending the processing solution to an upper region of the tank body, to thereby circulate the processing solution charged in the tank body from the upper region to the lower region.

7. The apparatus of claim 6, further comprising a drop stopper for allowing the processing solution to pass therethrough and preventing small parts that have dropped into the processing solution from further dropping into the auxiliary chamber, the drop stopper covering an area between a peripheral edge of the opening in the auxiliary chamber and a peripheral edge of an upper surface of the filter.

8. The apparatus of claim 7, further comprising a retention mechanism removably retained in or near at least one end of the filter.

9. The apparatus of claim 6, wherein the shortest distance between an upper surface of the filter and the photosensitive material immersed in the processing solution is 5 to 100 mm.

10. A photosensitive material processing apparatus including a tank that has a body charged with a solution that processes the photosensitive material, the apparatus comprising:
    a filter for purifying the processing solution;
    a subtank disposed on an outer side of a vertical side wall of the tank body and having a depth of at least one half that of the tank body;
    a plurality of through holes disposed on the vertical side wall between the tank body and the subtank; and
    a path for drawing processing solution from a lower region of the tank body through the filter and sending the processing solution to the subtank, and then passing the processing solution from the subtank through the through holes so that the processing solution flows evenly into the tank body from the subtank, to thereby uniformly mix the processing solution in the tank body.

11. The apparatus of claim 10, wherein the sectional area of each through hole gradually becomes smaller from an upper part of the vertical side wall to a lower part of the vertical side wall.

12. The apparatus of claim 11, wherein the horizontal sectional area of the subtank interior gradually becomes smaller from a lower part of the subtank to an upper part of the subtank.

13. A photosensitive material processing apparatus including a tank that has a body charged with a solution that processes the photosensitive material, the apparatus comprising:
    a filter for purifying the processing solution;
    a subtank disposed on an outer side of a vertical side wall of the tank body and having a depth of at least one half that of the tank body;
    a plurality of through holes disposed on the vertical side wall between the tank body and the subtank;
    a plurality of through holes disposed in a vertical side wall of a processing rack in the tank body at positions facing and corresponding to the through holes formed in the vertical side wall of the tank body; and
    a path for drawing processing solution from a lower region of the tank body through the filter and sending the processing solution to the subtank, and then passing the processing solution from the subtank through the through holes so that the processing solution flows evenly into the tank body from the subtank, to thereby uniformly mix the processing solution in the tank body.

14. The apparatus of claim 13, wherein the sectional area of each through hole gradually becomes smaller from an upper part of the vertical side wall to a lower part of the vertical side wall.

15. The apparatus of claim 14, wherein the horizontal sectional area of the subtank interior gradually becomes smaller from a lower part of the subtank to an upper part of the subtank.

16. A photosensitive material processing apparatus including a tank that has a body charged with a solution that processes the photosensitive material, the apparatus comprising:
 a filter for purifying the processing solution;
 a subtank disposed on an outer side of a vertical side wall of the tank body and having a depth of at least one half that of the tank body;
 a plurality of through holes disposed across a vertical range in the vertical side wall between the tank body and the subtank; and
 a path including branch pipes corresponding to the through holes, the path drawing the processing solution from a lower region of the tank body through the filter and sending the processing solution through the branch pipes corresponding to the through holes so that the processing solution flows evenly into the tank body, to thereby uniformly mix the processing solution in the tank body.

17. A photosensitive material processing apparatus including a tank that has a body charged with a solution that processes the photosensitive material, the apparatus comprising:
 a filter for purifying the processing solution;
 a subtank disposed on an outer side of a vertical side wall of the tank body and having a depth of at least one half that of the tank body;
 a through hole formed in a slit shape from an upper part of the vertical side wall to a lower part of the vertical side wall between the tank body and the subtank, with the sectional area of the through hole gradually becoming smaller from the upper part of the vertical side wall to the lower part of the vertical side wall; and
 a path for drawing processing solution from a lower region of the tank body through the filter and sending the processing solution to the subtank, and then passing the processing solution from the subtank through the slit-shaped through hole so that the processing solution flows evenly from a top part of the subtank to a bottom part of the subtank and into the tank body, to thereby uniformly mix the processing solution in the tank body.

18. A pleated cartridge filter for use in a photosensitive material processing apparatus including a processing tank charged with a solution that processes photosensitive material, a device for circulating the processing solution, and a fitting portion that is disposed in the circulation device and to which a filter for removing dust particles from the processing solution is fitted, the cartridge filter comprising:
 a cylindrical pleated filter body formed by folding a filtering sheet member; and
 a blocking member, including a hole that communicates between an interior of the filter body and the outside, for blocking at least one end of the filter body,
 wherein a portion of the blocking member contacting the fitting portion is compressed when the blocking member is fitted to the fitting portion to closely contact the same.

19. The cartridge filter of claim 18, wherein the blocking member comprises an elastic member having a hardness of 30 to 100 degrees, and the portion fitted to the fitting portion has a length of 1 to 5 mm.

20. The cartridge filter of claim 19, wherein the elastic member is a soft foamed resin impermeable to liquid.

21. A photosensitive material processing apparatus comprising: a processing tank charged with a processing solution that processes photosensitive material; a device for circulating the processing solution; and a fitting portion to which the pleated cartridge filter of claim 18 is fitted,
 wherein the fitting portion is recessed, with an aperture in a vicinity of an opening in the recess being 0.5 to 3.0% larger than an external diameter of the portion of the pleated cartridge filter that contacts the recess.

22. The apparatus of claim 21, wherein the vicinity of the opening in the recess is tapered so that the aperture gradually becomes larger towards the opening, with an angle of a tapered portion being set within a range of 0.5 to 45 degrees.

23. The apparatus of claim 22, wherein said recess has a depth of 2 to 30 mm.

* * * * *